(12) United States Patent
Hule et al.

(10) Patent No.: US 11,821,095 B2
(45) Date of Patent: Nov. 21, 2023

(54) COMPRESSION REACTORS AND METHODS FOR ELECTROCHEMICAL EXFOLIATION

(71) Applicants: ExxonMobil Chemical Patents Inc., Baytown, TX (US); The Texas A&M University System, College Station, TX (US)

(72) Inventors: Rohan Ashok Hule, Houston, TX (US); Micah J. Green, College Station, TX (US); Joshua T. Hope, College Station, TX (US); Wanmei Sun, College Station, TX (US)

(73) Assignees: Exxon Mobil Technology and Engineering Company, Annandale, NJ (US); The Texas A&M University System, College Station, TX (US)

( * ) Notice: Subject to any disclaimer, the term of this patent is extended or adjusted under 35 U.S.C. 154(b) by 98 days.

(21) Appl. No.: 17/193,916

(22) Filed: Mar. 5, 2021

(65) Prior Publication Data

US 2021/0285115 A1 Sep. 16, 2021

Related U.S. Application Data

(60) Provisional application No. 62/987,795, filed on Mar. 10, 2020.

(51) Int. Cl.
*C25B 9/05* (2021.01)
*C25B 1/135* (2021.01)
(Continued)

(52) U.S. Cl.
CPC ............. *C25B 9/05* (2021.01); *C01B 32/192* (2017.08); *C25B 1/135* (2021.01); *C25B 9/17* (2021.01);
(Continued)

(58) Field of Classification Search
CPC .. C25B 1/135; C25B 9/05; C25B 9/17; C25B 11/02; C25B 11/037; C25B 11/043; C25B 11/046
See application file for complete search history.

(56) References Cited

U.S. PATENT DOCUMENTS 4,350,576 A * 9/1982 Watanabe ................. C25B 1/00
205/551
6,406,612 B1 * 6/2002 Greinke ................. C01B 32/225
205/768

(Continued)

FOREIGN PATENT DOCUMENTS

CN 105731429 4/2018
WO 2015075455 5/2015
WO WO-2018031591 A1 * 2/2018 ............... B01J 8/00

OTHER PUBLICATIONS

Yi et al, "A mixed-solvent strategy for facile and green preparation of graphene by liquid-phase exfoliation of graphite", Jul. 10, 2012, Journal of Nanoparticle Research, vol. 14, article 1003, p. 1-9. (Year: 2012).*

(Continued)

*Primary Examiner* — Luan V Van
*Assistant Examiner* — Andrew Koltonow
(74) *Attorney, Agent, or Firm* — C. Tumey Law Group PLLC

(57) ABSTRACT

Processes and systems for electrochemical exfoliation that use a compression reactor and, more particularly, to processes and systems for electrochemical exfoliation of planar parent materials, such as graphite. A reactor for electrochemical exfoliation may include a container configured to hold an electrolyte solution. The reactor may further include a porous chamber, wherein the porous chamber is configured to hold a parent material in fluid communication with the electrolyte solution. The reactor may further include a (Continued)

pressure source positioned to apply a pressure along a length of the porous chamber to thereby compress the parent material in the porous chamber. The reactor may further include a first counter electrode. The reactor may further include a working electrode. The reactor may further include an electrical power source in electrical communication with the first counter electrode and the working electrode.

20 Claims, 10 Drawing Sheets

(51) Int. Cl.
  *C25B 9/17* (2021.01)
  *C25B 11/02* (2021.01)
  *C25B 11/043* (2021.01)
  *C25B 11/046* (2021.01)
  *C25B 11/037* (2021.01)
  *C01B 32/192* (2017.01)

(52) U.S. Cl.
  CPC ............ *C25B 11/02* (2013.01); *C25B 11/037* (2021.01); *C25B 11/043* (2021.01); *C25B 11/046* (2021.01)

(56) References Cited

U.S. PATENT DOCUMENTS

| | | | | |
|---|---|---|---|---|
| 6,756,027 | B2* | 6/2004 | Barsukov | C01B 32/22 205/768 |
| 2009/0026086 | A1* | 1/2009 | Zhamu | C01B 32/15 205/555 |
| 2013/0102084 | A1 | 4/2013 | Loh et al. | |
| 2013/0161199 | A1 | 6/2013 | Li et al. | |
| 2014/0044968 | A1* | 2/2014 | Papakonstantinou | B82Y 30/00 977/734 |
| 2014/0061059 | A1* | 3/2014 | Dryfe | C01B 32/19 205/555 |
| 2017/0370009 | A1* | 12/2017 | Zhamu | C25B 1/00 |
| 2019/0233291 | A1 | 8/2019 | Achee et al. | |
| 2021/0078863 | A1* | 3/2021 | Roscher | C25B 1/02 |

OTHER PUBLICATIONS

Cotet et al, "Versatile self-assembled graphene oxide membranes obtained under ambient conditions by using a water-ethanol suspension", Dec. 13, 2016, Journal of Materials Chemistry A, vol. 5, p. 2132-2142. (Year: 2016).*
Sierra, Uriel; Álvarez, Patricia; Blanco, Clara; Granda, Marcos; Santamaría, Ricardo; Menéndez, Rosa (2015). New alternatives to graphite for producing graphene materials. Carbon, 93( ), 812-818.
Cristina Botas; Patricia Álvarez; Clara Blanco; Ricardo Santamaría; Marcos Granda; Pablo Ares; Francisco Rodríguez-Reinoso; Rosa Menéndez (2012). The effect of the parent graphite on the structure of graphene oxide. , 50(1), 275-282.
Xing, Xiaohan; Zhang, Xiaohua; Zhang, Kang; Jin, Li'e; Cao, Qing (2018). Preparation of large-sized graphene from needle coke and the adsorption for malachite green with its graphene oxide. Fullerenes, Nanotubes and Carbon Nanostructures, ( ), 1-9.
Applied Polymer Science, Bansala, et al., High-density polyethylene reinforced by low loadings of electrochemically exfoliated graphene via melt recirculation approach, Sep. 2020.
ACS, Hope, et al., Scalable Production of Graphene Nanoplatelets for Energy Storage, Oct. 2020.
Ghaffarzadeh, K. Graphene, 2D Materials and Carbon Nanotubes: Markets, Technologies and Opportunities 2016-2026. Available at http://www.idtechex.com/research/reports/graphene-2d-materials-and-carbon-nanotubes-markets-technologies-and-opportunities-2016-2026-000465.asp. Accessed Dec. 27, 2016.
Parviz, Dorsa, Irin, Fahmida; Shah, Smit A.; Das, Sriya; Sweeney, Charles B.; Green, Micah J. (2016). Challenges in Liquid-Phase Exfoliation, Processing, and Assembly of Pristine Graphene. Advanced Materials, 28, 8796-8818.
Abdelkader, A. M.; Cooper, A. J.; Dryfe, R. A. W.; Kinloch, I. A. (2015). How to get between the sheets: a review of recent works on the electrochemical exfoliation of graphene materials from bulk graphite. Nanoscale, 7(16), 6944-6956.
Achee, Thomas C.; Sun, Wanmei; Hope, Joshua T.; Quitzau, Samuel G.; Sweeney, Charles Brandon; Shah, Smit A.; Habib, Touseef; Green, Micah J. (2018). High-yield scalable graphene nanosheet production from compressed graphite using electrochemical exfoliation. Scientific Reports, 8(1) 2018, 8, 14525.

* cited by examiner

COMPRESSION REACTORS AND METHODS FOR ELECTROCHEMICAL EXFOLIATION

CROSS-REFERENCE TO RELATED APPLICATIONS

This application claims priority to U.S. Provisional Application No. 62/987,795, filed Mar. 10, 2020, the entire disclosure of which is incorporated herein by reference.

FIELD

This application relates to processes and systems for electrochemical exfoliation that use a compression reactor and, more particularly, to processes and systems for electrochemical exfoliation of planar parent materials, such as graphite.

BACKGROUND

Electrochemical expansion of nanosheets expands nanosheet parent materials, such as graphite flakes or bulk molybdenum disulfide, by placing the parent materials under an electrical potential bias while the parent materials are in a specific chemistry that facilitates the expansion of the parent materials under the electrochemical bias. This expansion can occur through multiple mechanisms.

One example mechanism includes electrochemical treatment that causes the van der Waals forces holding the nanosheets in the material together to become weaker, allowing for greater ease of exfoliation by mechanical processes. These processes usually convert some fraction of the parent to nanomaterials, with that fraction usually being small. Other example mechanisms utilize electrochemical exfoliation. However, because the expansion of the parent material causes the parent material to fall apart, the processing of the parent material can be incomplete. Because these mechanisms usually use rods of compressed nanomaterial powder or foil as electrodes, these pieces of incompletely expanded material fall out of contact and disrupt the needed flow of electrical power, causing a failure to completely expand. The result can be incompletely expanded parent material, such as graphite. Such degradation of the electrode is one of the main barriers to making electrochemical exfoliation of parent materials that include layered nanosheets a scalable process. Further, separation of exfoliated materials from unexpanded parent material can be time consuming and expensive.

SUMMARY

Disclosed herein is an example reactor for electrochemical exfoliation. The reactor may include a container configured to hold an electrolyte solution. The reactor may further include a porous chamber, wherein the porous chamber is configured to hold a parent material in fluid communication with the electrolyte solution is in fluid communication with the parent material. The reactor may further include a pressure source positioned to apply a pressure along a length of the porous chamber to thereby compress the parent material in the porous chamber. The reactor may further include a first counter electrode. The reactor may further include a working electrode. The reactor may further include an electrical power source in electrical communication with the first counter electrode and the working electrode.

Further disclosed herein is an example method of electrochemical exfoliation. The method may include electrochemically exfoliating a parent material, wherein the electrochemically exfoliating includes introducing the parent material into a porous chamber, applying pressure along a length of the porous chamber to thereby compress the parent material in the porous chamber; and applying a potential bias to the parent material while at least a portion of the parent material is in contact with an electrolyte solution to produce a mixture of exfoliated material and unexfoliated parent material. The method may further include separating at least a portion of the exfoliated material from the unexfoliated parent material.

Further disclosed herein is an example method of electrochemical exfoliation. The method may include electrochemically exfoliating a parent material in a reactor to produce a mixture of exfoliated material and unexfoliated parent material. The reactor may include an electrolyte solution in fluid communication with the parent material. The reactor may further include a porous chamber holding the parent material. The reactor may further include a pressure source that applies pressure along a length of the porous chamber to thereby compress the parent material in the porous chamber. The reactor may further include a first counter electrode. The reactor may further include a working electrode. The reactor may further include an electrical power source in electrical communication with the first counter electrode and the working electrode. The method may further include separating at least a portion of the exfoliated material from the unexfoliated parent material.

BRIEF DESCRIPTION OF THE DRAWINGS

The drawings illustrate certain aspects of the present disclosure and should not be used to limit or define the disclosure.

DETAILED DESCRIPTION

Figure 1:
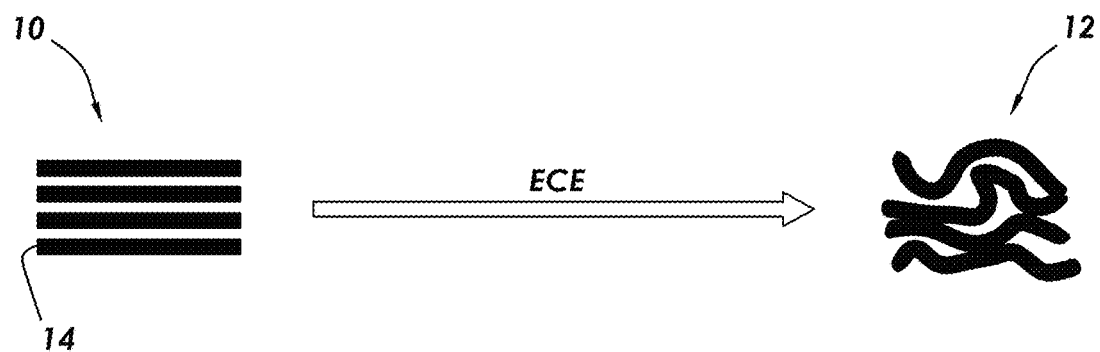
FIG. 1 is a schematic illustration of electrochemical exfoliation of a parent material.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

This application relates to processes and systems for electrochemical exfoliation that use a compression reactor and, more particularly, to processes and systems for electrochemical exfoliation of parent materials. The exfoliation of the parent materials generally results in exfoliated materials, such as graphene. While these processes and systems may be suitable for exfoliation of a variety of parent materials, they may be particularly suited for exfoliation of parent materials with a layered planar structure. By way of example, the processes and systems may be used for exfoliation of graphite to produce exfoliated graphite that includes graphene.

There may be several potential advantages to the methods and systems disclosed herein, only some of which may be alluded to in the present disclosure. As discussed above, current techniques for exfoliation of parent materials can be problematic. For example, electrochemical exfoliation can result in incomplete processing of the parent material when the rods of the parent material fall apart due to disruption of electric flow. Advantageously, embodiments of the present techniques for electrochemical foliation of parent materials can provide a scalable process that yields desirable levels of exfoliated material without typical problems associated with incomplete processing. Even further, embodiments of the present techniques for electrochemical exfoliation can provide improved kinetics and improved flexibility to produce exfoliated materials having a wide range of aspect ratios (length/thickness). For example, a maximum production rate for the electrochemical exfoliation may be achieved in about 30 minutes or less after initiation of the electrochemical exfoliation. In particular, present techniques have replaced rods of the parent material with compressed parent material. By way of example, the parent material may be placed in a porous chamber, and a pressure source may be applied along a length (e.g., a longitudinal length) of the porous chamber to compress the parent material. While submerged in an electrolyte solution, a voltage may be applied to drive ionic groups in the electrolyte solution to intercalate into the parent material thus, for example, increasing the inter-layer distance. In particular embodiments, this intercalation can expand graphite into exfoliated graphite that includes graphene.

Embodiments may include exfoliation of parent materials. In some embodiments, the parent material includes a plurality of layers adhered or chemically bonded to one another. In some embodiments, at least some of the plurality of layers are adhered to one another through, for example, non-covalent bonds, such as hydrogen bonds, van der Waals forces, and the like. In some embodiments, the parent material may have a layered planar structure. In some embodiments, the parent material may be an electrically conductive material with a plurality of layers. FIG. 1 illustrates an example parent material in the form of a layered parent material 10 that has a layered planar structure. As illustrated, the layered parent material 10 may include a plurality of planar layers 14. In accordance with present embodiments, the layered parent material 10 may be exfoliated to produce exfoliated layered parent material 12.

In some embodiments, the parent material may include layers that include nanosheets. As used herein, the term "nanosheets" refers to sheets having thickness of less than 1 micron. For example, nanosheets may have a thickness of about 0.5 nanometers to about 10 nanometers. In some embodiments, the layers of the parent material may be a single atom in thickness. By way of example, graphene nanosheets may be a single atom in thickness and may be isolated from a graphite parent material by electrochemical exfoliation as described herein.

A wide variety of suitable parent materials may be used in the techniques for electrochemical exfoliation. A particular example of a suitable parent material includes graphite, which can be exfoliated to produce graphene. However, the present disclosure is not limited to graphite and can be used for the exfoliation of other suitable materials, such as layered, two-dimensional materials. Additional examples of suitable parent materials may include, but are not limited to, petroleum feedstock (e.g., needle coke, petroleum coke, or synthetic graphite), tungsten diselenide, molybdenum disulfide, MAX phases, transition metal dichalcogenides, and gallium selenide. As used herein, the term "MAX phases" refers to layered, hexagonal carbides and nitrides. MAX phases may have the general formula $M_{n+1}AX_n$, wherein n is 1 to 3, M is an early transition metal, and A is sulfur, cadmium, a Group IIIA element, a Group IVA element, or a group V element, and X is carbon and/or nitrogen, wherein A is not carbon or nitrogen. Additionally, in certain embodiments, the disclosed techniques for electrochemical exfoliation may be applied to other aggregated systems that are not layered or two-dimensional in nature, especially, for example, for de-bundling carbon nanotubes, and other high aspect ratio nanomaterials.

The parent materials may be provided in any suitable form, such as particulates or blocks, for example. Where used in particulate form, the particulates of the parent materials that are utilized in particular embodiments may have a wide variety of shapes and sizes. By way of example, the particulates may have a well-defined physical shape as well as an irregular geometry, including the physical shape of platelets, powders, shavings, fibers, flakes, ribbons, rods, strips, spheroids, beads, toroids, pellets, tablets, or any other physical shape. Often, the particulates may have a uniform average particle size. Alternatively, in other embodiments, the particulates may have a non-uniform average particle size. Particle sizes may be measured using any suitable technique, such as a scanning electron microscope or optical microscopy. Crystalline grain size of the parent material may impact exfoliation. For example, a parent material with a smaller lateral size may improve yield. Even further, a parent material with lower crystallinity and a smaller lateral size may show increased yield. In some embodiments, the parent material has a largest lateral dimension of about 50 µm to about 1,000 µm, about 50 µm to about 500 µm, about 100 µm to about 500 µm, about 100 µm to about 400 µm, about 100 µm to about 300 µm, or about 100 µm to about 200 µm. The largest lateral dimension refers to a largest dimension between two points on lateral dimensions of the parent material, and may be measured using any suitable technique, such as a scanning electron microscope or optical microscopy.

The exfoliated material resultant from the exfoliation techniques disclosed herein is dependent upon, for example, the particular parent material used. By way of example, the exfoliation may create exfoliated material by separation of layers of the parent material. Examples of exfoliated materials that may be produced with the present technique may include, but are not limited to, graphene, graphene or graphite oxide, graphyne, borophene, germanene, germanane, silicone, stanine, phosphorene, molybdenite, 2D metals, hexagonal boron nitride, transition metal di-chalcogenides, molybdenum disulfide, tungsten diselenide, and MXenes. As used herein, the term "Mxenes" refers to a class of two-dimensional structures have the general formula $M_{n+1}AX_n$, wherein M is a transition metal, A is an element from group 13 or 14 of the period table, X is carbon or nitrogen, and N is an integer from 1 to 4. In some embodiments, the exfoliated material may include sheets, plates, layers, or the like, wherein at least a portion the sheets, plates, layers, etc. are physically separated from other sheets, plates, layers, etc.

In some embodiments, the exfoliated material includes graphene and the molar ratio of carbon to oxygen of the exfoliated material may be between about 30:1 and about 3:1. For example, the molar ratio of carbon to oxygen of the exfoliated material may be between about 30:1 and about 10:1. By way of further example, the molar ratio of carbon to oxygen of the exfoliated material may be between about 30:1 and about 20:1.

In some embodiments, the exfoliated materials include exfoliated nanosheets. In some embodiments, the exfoliated nanosheets have a first major surface and a generally opposing second major surface, which can define the lateral dimensions of the exfoliated nanosheets. The largest lateral distance of the exfoliated nanosheets may be considered the two points on the first or the second major surface that are farthest away from one another. In some embodiments, the average largest lateral dimension of the exfoliated nanosheets may about 75 µm to about 300 µm or about 150 µm to about 300 µm, or about 200 µm to about 300 µm. The exfoliated nanosheets may also have a thickness, defined as the distance between the first major surface and the second major surface. In some embodiments, the exfoliated nanosheets may have an average thickness of about 0.5 nm to about 10 nm, about 2 nm to about 10 nm, or about 5 nm and to 10 nm. In some embodiments, the electrochemical exfoliation can provide exfoliated materials have a wide range of aspect ratios (length/thickness). For example, the exfoliated materials may have an aspect ratio (length/thickness) of about 100 to about 100,000 or of about 1,000 to about 20,000. In some embodiments, for example, with a petroleum-based feedstock, aspect ratio of the exfoliated material may be about 100 to about 1,000.

As described above, previous methods of exfoliating parent materials may be limited in how much parent material can be exfoliated. This is in contrast to the methods disclosed herein. In some embodiments, the compositions disclosed herein include greater than 75% exfoliated material by dried solid mass. In some embodiments, the compositions disclosed herein include between about 80% and about 99% exfoliated material by dried solid mass. In some embodiments, the compositions disclosed herein include between about 90% and about 99% exfoliated material by dried solid mass.

Figure 2:
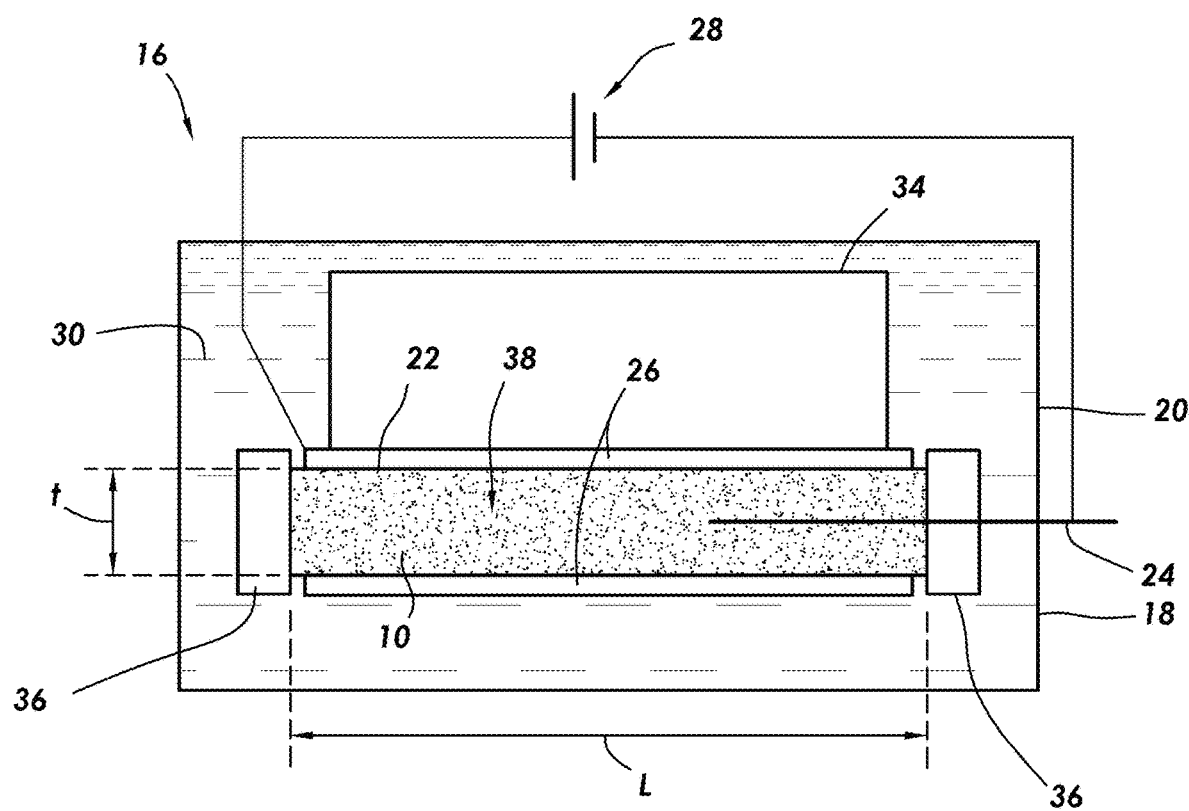
FIG. 2 is a schematic illustration of a reactor for electrochemical exfoliation in accordance with some embodiments of the present disclosure.

FIG. 2 illustrates a reactor 16 for electrochemical exfoliation of a parent material in accordance with example embodiments. In the illustrated embodiment, the reactor 16 includes a container 18, a porous chamber 22, a working electrode 24, a pair of counter electrodes 26, and an electrical power source 28. As illustrated, the container 18 may contain an electrolyte solution 30 in which the porous chamber 22 may be placed. The parent material 10 may be positioned in the porous chamber 22 on which a pressure may be applied by a pressure source 34 to compress the parent material 10. While particulates of the parent material 10 are shown, it should be understood that other forms of the parent material 10 may be used in the reactor 16 for electrochemical exfoliation. Electrical power source 28 may be used to apply a voltage to the parent material 10 for exfoliation of the parent material, for example, a voltage of about 1 V to above 20 V or about 5 V to about 20 V.

In some embodiments, the electrolyte solution 30 includes an electrolyte dissolved in a solvent. Examples of suitable electrolytes may include, but are not limited to, sodium sulfate, potassium sulfate, ammonium sulfate, sulfuric acid, nitric acid, phosphoric acid, sodium nitrate, sodium phosphate, potassium phosphate, ammonium phosphate, sodium nitrate, potassium nitrate, ammonium nitrate, sodium perchlorate, potassium perchlorate, ammonium perchlorate, sodium chloride and combinations thereof. In some embodiments, the electrolyte solution 30 may include lithium ions. In some embodiments, the solvent may include water. Alternatively, examples of suitable solvents may include an organic solvent such as dichloromethane, dichlorobenzene, diphenyl ether, dimethylformamide, dimethylsulfoxide, n-methylpyrrolidone, and combinations thereof. One of ordinary skill in the art, with the benefit of this disclosure, should be able to select an appropriate electrolyte solution for a particular application.

In some embodiments, the porous chamber 22 may be placed in the electrolyte solution 30. The porous chamber 22 may be oriented in the electrolyte solution 30 in any suitable manner, for example, the porous chamber 22 may be oriented with its longitudinal axis extending in a generally horizontal direction or a generally vertical direction. As used herein, the terms "generally horizontally" and "generally vertically" reference orientations that are within plus or minus about 5 degrees from horizontal or vertical, respectively. However, it should be understood that the porous chamber 22 may also be oriented with its longitudinal axis being angled in the range of about 5 degrees to about 85 degrees from horizontal. By placement in a generally horizontal direction, a weight may be used as the pressure source 34, for example, relying on gravity for application of the pressure. The porous chamber 22 may be elongated such that it has a relatively high aspect ratio (length to width) (e.g., 3:1, 5:1, 10:1 or greater). In some embodiments, the porous chamber 22 may be generally tubular or otherwise configured for holding the parent material 10.

The porous chamber 22 should hold the parent material 10 while allowing the electrolyte solution 30 to pass through, but not the parent material 10 or exfoliated material. In some embodiments, the porous chamber 22 is further configured to allow the electrolyte solution 30 to pass through without allowing the parent material (or exfoliated material) to pass through. By way of example, the pore size of the porous chamber 22 may be selected to allow passage of the electrolyte solution with passage of the parent material (or exfoliated material) therethrough.

In some embodiments, the porous chamber 22 includes pores configured to exclude the parent material 10. In some embodiments, the porous chamber 22 includes pores having pore sizes smaller than an average smallest lateral dimension of the parent material 10 and the exfoliated material. As used herein, a smallest lateral dimension of the parent material 10 refers the smallest distance between two points on one of the first major surface or second major surface. First major surfaces and second major surfaces are discussed further herein with respect to largest lateral dimensions of exfoliated materials. Non-limiting examples of suitable pore sizes for the porous chamber 22 include, but are not limited to, pores having pore sizes between about 10 nm and about 10 µm. In an embodiment, the porous chamber 22 includes pores having pore sizes of about 25 nm to about 75 nm.

The porous chamber 22 may include any suitable chambers for a particular application. Examples of suitable materials for the porous chamber 22 may include, but are not limited to, a porous polymeric material, a porous metallic material, porous glass, a woven porous material, a non-woven porous material, and combinations thereof. In an embodiment, the porous chamber 22 includes a porous material chosen from hydrophilic polytetrafluoroethylene (PTFE), hydrophobic PTFE, glass, cellulose, polycarbonate, cellulose acetate, nylon, cellulose esters, cotton cloth, and combinations thereof. A particular example includes a porous bag. In one particular embodiment, the porous chamber 22 is a dialysis bag. In some embodiments, the porous chamber 22 may include a support structure (e.g., frame 40 shown on FIG. 3) disposed therein. The frame 40 provides a controlled shape for the porous chamber 22 containing the parent material 10 so pressure can be applied along the bed of the parent material, for example, to prevent the parent material 10 from moving outwards away from the applied pressure.

As illustrated in FIG. 2, embodiments may further include one or more seals 36 on the porous chamber 22. In the illustrated embodiment, seals 36 are positioned on either end of the porous chamber 22. By way of example, the seals 36 may close open ends of the porous chamber 22 to seal the parent material 10 in the porous chamber 22. Any suitable seals 36 may be used. Examples of suitable seals 36 may include, but are not limited to, clamps, adhesives, and interlocking features (e.g., grooves/ridges), among others.

As previously, described, the porous chamber 22 may hold parent material 10 in accordance with present embodiments. In the illustrated embodiments, the parent material 10 comprises particulates arranged to form a bed 38 of the parent material 10. As illustrated, the bed 38 may have a length L and a thickness t. While not shown on FIG. 2, the bed 38 may also have a width w. In accordance with present embodiments, the length L, thickness t, and width w of the bed 38 may be selected to increase a yield of the exfoliated material. By way of example, selection of an appropriate length L, thickness t, and/or width w of the bed 38 can improve the yield of the exfoliated material produced in the reactor 16, thus providing reactor 16 scalability. In some embodiments, the yield of the reactor may be about 10% or greater, for example, about 15% or greater, about 20% or greater, about 30% or greater, about 40% or greater, or about 50% or greater. Design of the reactor 16 may also provide improved kinetics of the electrochemical exfoliation.

By way of example, the bed 38 of the parent material 10 may have length L of about 50 millimeters to about 1 meter, or about 50 millimeters to about 500 millimeters, or about 50 millimeters to about 300 millimeters, or about 50 millimeters to about 500 millimeters, or about 50 millimeters to about 500 millimeters, or about 50 millimeters to about 300 millimeters, or about 50 millimeters to about 200 millimeters, or about 100 millimeters to about 500 millimeters, or about 100 millimeters to about 400 millimeters, or about 100 millimeters to about 300 millimeters, or about 100 millimeters to about 200 millimeters, or about 200 millimeters to about 500 millimeters, or about 200 millimeters to about 400 millimeters, or about 200 millimeters to about 300 millimeters. By way of further example, the bed 38 of the parent material 10 may have thickness t of about 0.5 millimeters to about 10 millimeters, or about 1 millimeter to about 5 millimeters, or about 2 millimeters to about 5 millimeters, or about 3 millimeters to about 5 millimeters, or about 4 millimeters to about 5 millimeters, or about 1 millimeters to about 4 millimeters, or about 2 millimeters to about 4 millimeters, or about 3 millimeters to about 4 millimeters. By way of further example, the bed 38 of the parent material 10 may have width w of about 0.5 millimeters to about 5 millimeters, or about 1 millimeter to about 5 millimeters, or about 2 millimeters to about 5 millimeters, or about 3 millimeters to about 5 millimeters, or about 4 millimeters to about 5 millimeters, or about 1 millimeters to about 4 millimeters, or about 2 millimeters to about 4 millimeters, or about 3 millimeters to about 4 millimeters Those of ordinary skill in the art, with the benefit of this disclosure, should be able to select appropriate dimensions for the bed 38 that would be suitable for a particular application.

The parent material 10 may be compressed into the bed 38 by the pressure source 34. The pressure source 34 should maintain sufficient pressure on the bed 38 to maintain conditions necessary to generate the exfoliated material. By way of example, the pressure on the bed 38 should compress the parent material 10 so that electrical connections can be maintained in the bed 38 during exfoliation. The pressure source 34 can apply the pressure to the bed 38 through the porous chamber 22. As illustrated, at least one of the counter electrodes 26 and the porous chamber 22 may be disposed between the pressure source 34 and the bed 38 of the parent material 10. In the illustrated embodiment, the pressure source 34 applies pressure along a longitudinal length of the porous chamber 22. In some embodiments, the pressure source 34 may apply pressure substantially along a longitudinal length of the porous chamber 22. For example, the pressure may be applied along at least 50%, 60%, 70%, 80%, 90%, 95%, or 98% of the length of the porous chamber 22.

The pressure applied by the pressure source 34 may be a constant or variable pressure. Examples of suitable constant pressure sources may include, but are not limited to, weights and springs. In addition, springs and weights may also be configured as variable pressure sources. Any suitable pressure may be applied to the bed 38. For example, the suitable pressures may be about 0.1 kPa to about 1 MPa or about 1 kPa to about 10 kPa. Those of ordinary skill in the art, with the benefit of this disclosure, should be able to select an appropriate pressure that would be suitable for a particular application.

In the illustrated embodiments, the reactor 16 has an electrical system that includes a working electrode 24, a pair of counter electrodes 26, and an electrical power source 28. As previously described, the electrical power source may be used to apply a voltage to the parent material 10 for exfoliation of the parent material. In the illustrated embodiment, an electrical circuit may be completed by the pair of counter electrodes 26 that includes the working electrode 24, the parent material 10, the electrolyte solution 30, and the electrical power source 28. Current may flow from the working electrode 24 through the parent material 10 and the electrolyte solution 30 to the pair of counter electrodes 26.

As illustrated, the working electrode 24 may at least partially extend into the porous chamber 22. For example, the working electrode 24 may extend into and be disposed in the parent material 10 in the porous chamber 22. As illustrated, the working electrode may also be disposed in the electrolyte solution 30. For example, the working electrode 24 may be partially or completely submerged in the electrolyte solution 30.

The working electrode 24 may be made of any suitable material for facilitating the exfoliation of the parent material. During operation, a positive voltage may be applied to the working electrode 24 such that a potential difference is provided between the pair of counter electrodes 26 and the working electrode. Examples of suitable materials may include, but are not limited to, graphite, noble metals, copper, and stainless steel. Examples of suitable noble metals may include, but are not limited to, platinum, palladium, iridium, gold, and combinations thereof. In some embodiments, the working electrode 24 may be a graphite foil or a graphite rod. In some embodiments, the working electrode 24 may be the same material as the parent material. In some embodiments, the working electrode 24 and the pair of counter electrodes 26 may be the same material as the parent material. One of ordinary skill in the art with the benefit of this disclosure should be able to select an appropriate material for the working electrode 24 for a particular application.

As illustrated, the pair of counter electrodes 26 may be disposed in the electrolyte solution 30. For example, the pair of the counter electrodes 26 may be partially or completely submerged in the electrolyte solution 30. In accordance with present embodiments, the pair of counter electrodes 26 may be positioned proximate to the bed 38 of the parent material 10. By way of example, the pair of counter electrodes 26 may be positioned within about 10 cm of the bed 38, about 5 cm of the bed 38, or about 2 cm of the bed 38, or closer. In some embodiments, at least one electrode of the pair of counter electrodes 26 may be positioned between the pressure source 34 and the porous chamber 22. In some embodiments, at least one electrode of the pair of counter electrodes 26 may be in contact with the porous chamber 22. In some embodiments, at least one electrode of the pair of counter electrodes 26 may be positioned on top of the porous chamber 22 while the other electrode of the pair of counter electrodes 26 may be positioned under the porous chamber 22.

In the illustrated embodiments, each of the pair of counter electrodes 26 extends along a longitudinal length of the porous chamber 22. As illustrated, the pair of counter electrodes 26 may be disposed on opposite sides of the porous chamber 22 from one another with each of the pair of counter electrodes extending along a length of the porous chamber 22. In some embodiments, at least one electrode of the pair of counter electrodes 26 may extend substantially along a longitudinal length of the porous chamber 22. For example, at least one electrode of the pair of counter electrodes 26 may extend along at least 50%, 60%, 70%, 80%, 90%, 95%, or 98% of the length of the porous chamber 22. As illustrated, both electrodes of the pair of counter electrodes 26 may extend substantially along a longitudinal length of the porous chamber 22.

The pair of counter electrodes 26 may be made from any suitable material for completion of the electric circuit. During operation, a negative voltage may be applied to the pair of counter electrodes 26, for example, so that pair of counter electrodes 26 do not take part in the reduction reaction. Examples of suitable materials may include, but are not limited to, noble metals, copper, steel (e.g., stainless steel). In some embodiments, the pair of counter electrodes 26 may be copper mesh. Examples of suitable noble metals may include, but are not limited to, platinum, palladium, iridium, gold, and combinations thereof. In some embodiments, the pair of counter electrode 26 may be the same material as the parent material. One of ordinary skill in the art with the benefit of this disclosure should be able to select an appropriate material for the pair of counter electrodes 26 for a particular application.

In accordance with some embodiments, the electrical power source 28 may apply a potential bias to the parent material 10. The electrical power source 28 may be electrically coupled to the working electrode 24 and the pair of counter electrodes 26. In the illustrated embodiments, an electric circuit is provided that include the working electrode 24, the pair of counter electrodes 26, the electrical power source 28, the electrolyte solution 30, and the parent material 10. The electrical power source 28 may be configured to produce any suitable current. For example, the electrical power source 28 may be configured to produce alternative current or direct current. In particular embodiments, the electrical power source 28 may be configured to produce alternating current that is sinusoidal or alternating current with a constant voltage.

The electrical power source 28 may be configured to produce electrical power sufficient to generate exfoliated material from the parent material 10. In some embodiments, the electrical power source 28 is configured to apply a potential bias of about 1 V and about 20 V to the parent material 10. In an embodiment, the electrical power source 28 is configured to apply a potential bias of about 1 V and about 20 V to the parent material 10. By way of example, the electrical power source 28 is configured to apply a potential bias of about 5 V and about 20 V to the parent material 10.

With continued reference to FIG. 2, an example method for use of the reactor 16 for exfoliation of the parent material will now be described in more detail. In accordance with some embodiments, the parent material 10 may be placed into the porous chamber 22. The porous chamber 22 may then be sealed, for example, at one or more ends to seal the parent material into the porous chamber 22. The porous chamber 22 may then be placed into the container 20 where the pressure source 34 may then be used for application of pressure along a length of the porous chamber 22, thus compressing the parent material 10. The working electrode 24 may also be inserted into the porous chamber 22 such that is may be disposed in the parent material 10. It should be understood that the working electrode 24 may inserted into the porous chamber 22 at any suitable time. For example, the working electrode 24 may be inserted before or after addition of the parent material 10 and also before or after placement of the porous chamber 22 into the container. The working electrode 24, the pair of counter electrodes 26, and the porous chamber 22 may then be placed in the electrolyte solution 30. In some embodiments, the electrolyte solution 30 may be in the container 20 when the porous chamber 22 is inserted. However, the electrolyte solution 30 may also be introduced into the container 20 after the porous chamber.

To initiate electrochemical exfoliation of the parent material in the porous chamber 22, the electrical power source 28 may be used to apply a potential bias to the parent material 10. Ionic groups in the electrolyte solution 30 may intercalate into the parent material, thus, for example, increasing the inter-layer distance and cause the parent material 10 to expand, for example, generally upwards. In some embodiments, as the distance is increased, layers of the parent material may be separated. In this manner, exfoliated material may be produced by the electrochemical exfoliation. In particular embodiments, the electrochemical exfoliation can expand graphite into exfoliated graphite that includes graphene.

Figure 3:
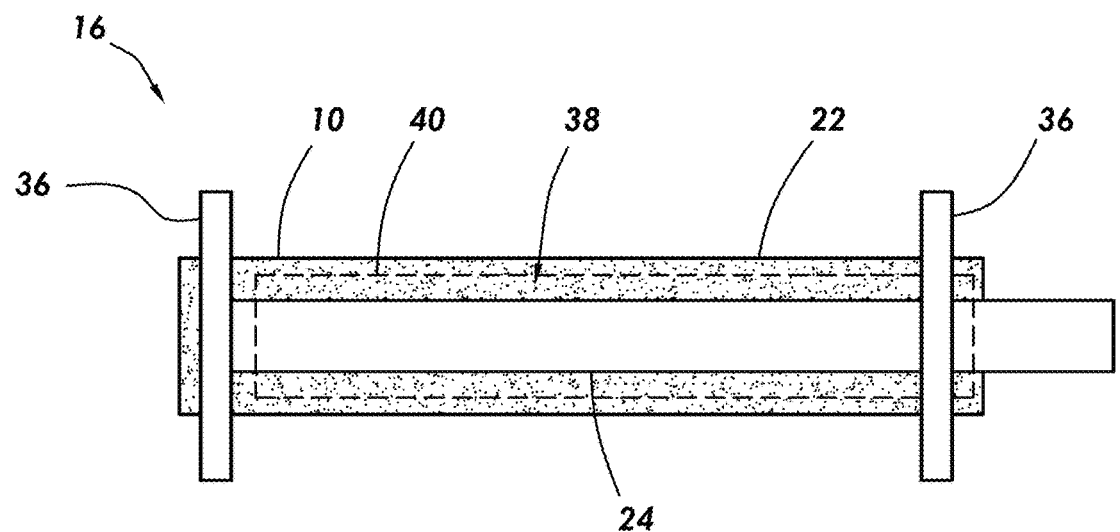
FIG. 3 is a top down view of the reactor of FIG. 2 in accordance with some embodiments of the present disclosure.

FIG. 3 is a top view of reactor 16 in accordance with some embodiments. For illustrative purposes, the container 20, pair of counter electrodes 26, and pressure source 34 are not shown. As illustrated, the parent material 10 may be disposed in the porous chamber 22. The parent material 10 may be compressed into a bed 38 of the parent material 10. The working electrode 24 may extend into the porous chamber 22 such that the working electrode 24 is in the bed 38 of the parent material 10. Seals 36 may be positioned at either end of the porous chamber 22 for securing the parent material 10 in the porous chamber 22.

In the illustrated embodiment, the porous chamber 22 further includes a frame 40. As illustrated, the frame 40 may be disposed in the porous chamber 22. Among other things, the frame 40 can provide structural support for the porous chamber 22.

Figure 4:
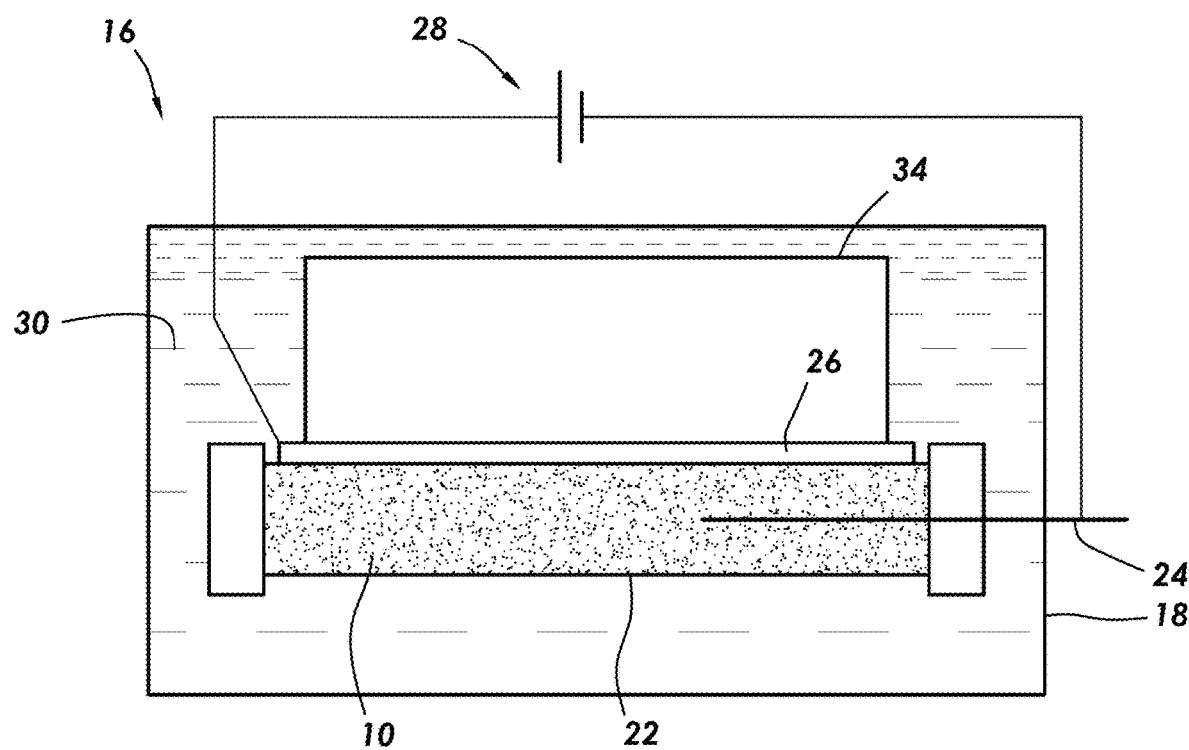
FIG. 4 is a schematic illustration of a reactor for electrochemical exfoliation in accordance with alternative embodiments of the present disclosure.

FIG. 4 is a schematic illustration of an alternative embodiment of the reactor 16 in accordance with some embodiments. The illustrated embodiment is similar to the reactor 16 of FIG. 2. As illustrated, the reactor 16 includes a container 18, a porous chamber 22, a working electrode 24, and an electrical power source 28. However, the embodiment of FIG. 4 includes a counter electrode 26 on only one side of the porous chamber 22. As illustrated, the container 18 may contain an electrolyte solution 30 in which the porous chamber 22 may be placed. Parent material 10 may be positioned in the porous chamber 22 on which a pressure may be applied by a pressure source 34 to compress the parent material 10. Electrical power source 28 may be used to apply a voltage to the parent material 10 for exfoliation of the parent material.

The counter electrode 26 may be disposed in the electrolyte solution 30. For example, the counter electrode 26 may be partially or completely submerged in the electrolyte solution 30. In accordance with present embodiments, the electrode 26 may be positioned proximate to the bed 38 of the parent material 10. In illustrated embodiment, the counter electrode 26 may be positioned between the pressure source 34 and the porous chamber 22. In some embodiments, the counter electrode 26 may be in contact with the porous chamber 22. In some embodiments, the counter electrode 26 may be positioned on the porous chamber 22.

In the illustrated embodiment, the counter electrode 26 extends along a longitudinal length of the porous chamber 22. In some embodiments, the counter electrode 26 may extend substantially along a longitudinal length of the porous chamber 22. For example, the counter electrode may extend along at least 50%, 60%, 70%, 80%, 90%, 95%, or 98% of the length of the porous chamber 22.

The counter electrode 26 may be made from any suitable material for completion of the electric circuit. During operation, a negative voltage may be applied to the counter electrode 26, for example, so that the counter electrode 26 does not take part in the reduction reaction. Examples of suitable materials may include, but are not limited to, noble metals, copper, steel (e.g., stainless steel). In some embodiments, the counter electrode 26 may be copper mesh. Examples of suitable noble metals may include, but are not limited to, platinum, palladium, iridium, gold, and combinations thereof. In some embodiments, the counter electrode 26 may be the same material as the parent material. One of ordinary skill in the art with the benefit of this disclosure should be able to select an appropriate material for the counter electrode 26 for a particular application.

Figure 5:
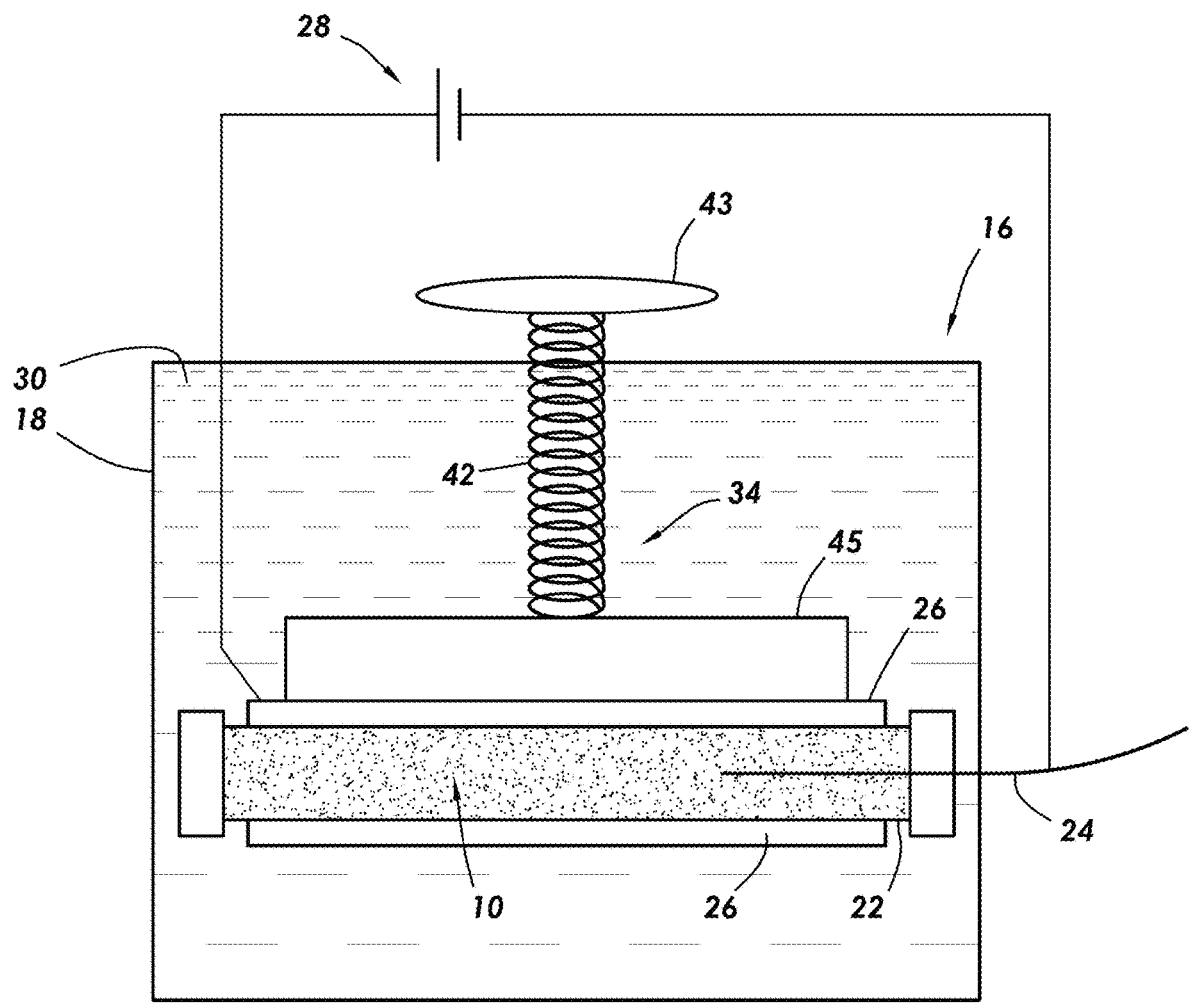
FIG. 5 is a schematic illustration of a reactor for electrochemical exfoliation in accordance with alternative embodiments of the present disclosure.

FIG. 5 is a schematic illustration of an alternative embodiment of the reactor 16 in accordance with some embodiments. The illustrated embodiment is similar to the reactor 16 of FIG. 2. As illustrated, the reactor 16 includes a container 18, a porous chamber 22, a working electrode 24, a pair of counter electrodes 26, and an electrical power source 28. Exemplary embodiments of the reactor 16 also include a pressure source 34. In the illustrated embodiment, the pressure source 34 includes a spring 42 for applying pressure to the parent material 10 in the porous chamber 22. As illustrated, a fixture 43 may support and position the spring 42. The spring 42, for example, may bias a plate 45 that applies pressure to the porous chamber 22. As illustrated, the container 18 may contain an electrolyte solution 30 in which the porous chamber 22 may be placed. Parent material 10 may be positioned in the porous chamber 22 on which a pressure may be applied by the pressure source 34 to compress the parent material 10. Electrical power source 28 may be used to apply a voltage to the parent material 10 for exfoliation of the parent material.

Figure 6:
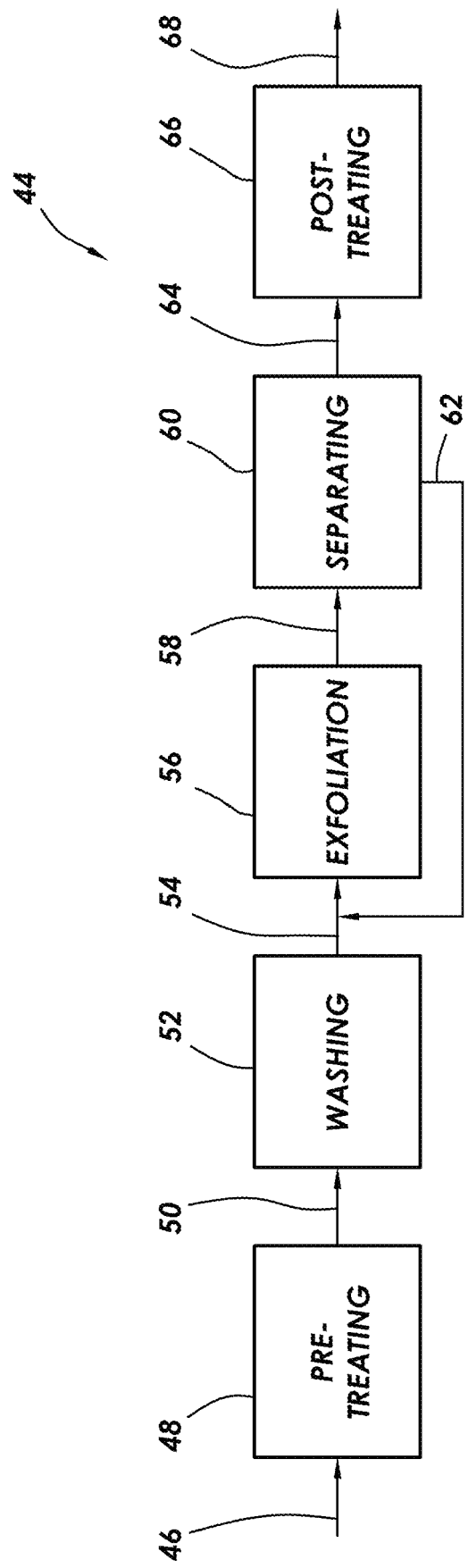
FIG. 6 is a flow diagram of a method for electrochemical exfoliation in accordance with some embodiments of the present disclosure.

FIG. 6 is a flowchart illustrating an example method 44 for exfoliation of a parent material in accordance with some embodiments. As illustrated, the method 44 may use a feed 46 of the parent material. The parent material used in this example method may include any of the parent materials previously described. In some embodiments, the feed 46 includes particulates of the parent material. In block 48, the method may include pretreating the feed 46 of the parent material. Pretreating of the feed 46 may include treatment of the parent material to increase hydrophilicity. With the parent material being rendered more hydrophilic, the electrolyte solution 30 (e.g., FIG. 2) should more readily wet a greater portion of the parent material expediting exfoliation. Pretreating may include any suitable technique for increasing hydrophilicity, including, but not limited to, functionalization with a hydrophilic moiety or oxygen plasma treatment. Examples of suitable hydrophilic moieties may include, but are not limited to, a hydroxyl group, a carbonyl group, an amine group, an epoxide group, an ether group, a diazonium group, and a carboxyl group. The functionalization may include treatment of the parent material with an acid solution. By way of example, the parent material may be heated in an acid solution. In particular embodiments, the parent material may be heated in an autoclave with nitric acid. As illustrated, hydrophilic parent material 50 from the pre-treating may be fed to block 52 for washing. By way of example, the hydrophilic parent material 50 may be washed with water for removal of the acid solution from block 48. In some embodiments, washing of the hydrophilic parent material 50 may not be required.

The washed parent material 54 may then be fed to block 56 for exfoliation. The washed parent material may be exfoliated using the reactor 16 (e.g., FIGS. 2-5) as previously described. In block 56, exfoliated material may be produced by electrochemical exfoliation. However, it should be understood that the reaction may not be complete so that a mixture 58 of exfoliated material and unexfoliated particulates may be provided to block 60 for separating. In block 60, the exfoliated material may be separated from the unexfoliated particulates. The separating of block 60 may use any suitable technique. For example, the separation of the exfoliated material from the unexfoliated particulates may use sedimentation or centrifuging. In some embodiments, the mixture 58 may be washed, for example, with water, prior to the separating for removal of the electrolyte solution 30 (e.g., FIG. 2). In some embodiments, the mixture 58 may then be combined with a solvent and then introduced into a separator for sedimentation, for example, with the sediment including unexfoliated parent material with supernatant including exfoliated material. Choice of solvent may impact separation efficiency. Suitable solvents may include, but are not limited to, water, ethanol, acetone, isopropanol, n-methyl-2-pyrrolidone, dimethylformamide, and chloroform, among others. Some embodiments may include a solvent that includes water and ethanol. The volume fraction of the ethanol in the solvent may be about 0% to about 90%, about 5% to about 80%, about 5% to about 60%, about 5% to about 50%, about 10% to about 50%, about 10% to about 40%, about 10% to about 40%, or about 20% to about 30%. A recycle 62 of the unexfoliated particulates separated from the exfoliated material may be recycled to the block 56 for further exfoliation. For instance, in the illustrated embodiment, the recycle 62 is combined with washed parent material 54, and the combined materials are fed to block 56. An exfoliated material 64 separated from the unexfoliated particulates may then be provided to block 66 for post-treatment to produce a post-treated material 68. Post-treatment in block 66 may include, for example, dispersion of the exfoliated material as aggregates of the exfoliated material may have formed. An example technique for dispersion may include shear mixing. In some embodiments, the dispersed and exfoliated material may be dried, for example, freeze dried.

Accordingly, the preceding description describes examples of processes and systems for electrochemical exfoliation of parent materials, such as graphite. The processes and systems disclosed herein may include any of the various features disclosed herein, including one or more of the following embodiments.

Embodiment 1

A reactor for electrochemical exfoliation may comprise an electrolyte solution. The reactor may further comprise a porous chamber submerged in the electrolyte solution, wherein the porous chamber is configured to hold a parent material, and wherein the electrolyte solution is in fluid communication with the parent material. The reactor may further comprise a pressure source positioned to apply a constant pressure along a length, such as at least a substantial length, of the porous chamber to thereby compress the parent material in the porous chamber. The reactor may further comprise a first counter electrode. The reactor may further comprise a working electrode. The reactor may further comprise a power source in electrical communication with the pair of counter electrodes and the working electrode.

Embodiment 2

The reactor of embodiment 1, wherein the porous chamber is oriented generally horizontally.

Embodiment 3

The reactor of embodiment 1 or embodiment 2, wherein the porous chamber comprises pores having pore sizes between about 10 nm and about 10 µm.

Embodiment 4

The reactor of any one of embodiments 1-3, wherein a frame is disposed in the porous chamber.

Embodiment 5

The reactor of any one of embodiments 1-4, wherein the parent material is in the form of particulates.

Embodiment 6

The reactor of embodiment 5, wherein the particulates form a bed in the porous chamber having a length of about 50 millimeters to about 500 millimeters and a thickness of about 0.5 millimeters to about 5 millimeters.

Embodiment 7

The reactor of any one of embodiments 1-6, wherein the working electrode extends at least partially into the porous chamber and/or wherein the first counter electrode is positioned in the electrolyte solution along the length of the porous chamber.

Embodiment 8

The reactor of any one of embodiments 1-7, wherein the pressure source is configured to apply pressure along at least 90% of the length of the porous chamber.

Embodiment 9

The reactor of any one of embodiments 1-8, wherein the pressure source comprises at least one of a weight or a spring.

Embodiment 10

The reactor of any one of embodiments 1-9, wherein the first counter electrode is positioned between the pressure source and the porous chamber, and wherein each of the first counter electrode and the porous chamber are positioned generally horizontally in the electrolyte solution.

Embodiment 11

The reactor any one of embodiments 1-10, further comprising a second counter electrode, wherein the first and the second counter electrodes are in contact with the porous chamber, and wherein the first and the second counter electrodes are disposed on opposite sides of the porous chamber from one another.

Embodiment 12

The reactor of embodiment 1, wherein the porous chamber is submerged in the electrolyte solution in a general horizontal orientation; wherein the pressure source comprises a weight that is configured to apply a constant pressure along at least a substantially length of the porous chamber, wherein the reactor further comprises a pair of counter electrodes submerged in the electrolyte solution and in contact with the porous chamber, wherein the pair of counter electrodes are disposed on opposite sides of the porous chamber from one another, wherein the pair of counter electrodes comprises the first counter electrode, wherein the working electrode is submerged in the electrolyte solution, wherein the working electrode extends at least partially into the porous chamber, and wherein the reactor further comprises a power source in electrical communication with the pair of counter electrodes and the working electrode Embodiment 13

The reactor of embodiment 12, wherein the first counter electrode is disposed on top of the porous chamber, and wherein the other electrode of the pair of counter electrodes is disposed underneath the porous chamber.

Embodiment 14

The reactor of embodiment 12 or embodiment 13, wherein one electrode of the pair of counter electrodes is positioned between the weight and the porous chamber.

Embodiment 15

A method of electrochemical exfoliation may comprise electrochemically exfoliating a parent material, wherein the electrochemically exfoliating comprises introducing the parent material into a porous chamber, applying pressure along a length of the porous chamber to thereby compress the parent material in the porous chamber, and applying a potential bias to the parent material while at least a portion of the parent material is in contact with an electrolyte solution to produce a mixture of exfoliated material and unexfoliated parent material. The method may further comprise separating at least a portion of the exfoliated material from the unexfoliated parent material.

Embodiment 16

The method of embodiment 15, wherein the potential bias is applied while the porous chamber is disposed generally horizontally in the electrolyte solution.

Embodiment 17

The method of embodiment 15 or embodiment 16, wherein applying pressure to the porous chamber comprises applying a weight to the porous chamber, and wherein a counter electrode is positioned between the weight and the porous chamber.

Embodiment 18

The method of any one of embodiments 15-17, wherein applying the potential bias comprises applying a negative voltage to a pair of counter electrodes with one electrode of the pair of counter electrodes positioned on top of the porous chamber and another electrode of the counter electrodes positioned under the porous chamber, and wherein the pair of counter electrodes and the porous chamber are positioned generally horizontal in the electrolyte solution.

Embodiment 19

The method of any one of embodiments 15-18, further comprising pretreating the parent material to increase hydrophilicity.

Embodiment 20

The method of any one of embodiments 15-19, wherein the step of separating comprises combining the mixture with a solvent and then placing the combination of the solvent and the mixture in a separation tower to allow sedimentation of the unexfoliated parent material.

Embodiment 21

The method of embodiment 20, wherein the solvent comprises water and ethanol, wherein a volume fraction of the ethanol in the solvent is in a range from about 10% to about 40%.

Embodiment 22

The method of embodiment 15, wherein a maximum production rate of the exfoliated material is achieved in about 30 minutes or less after the step of electrochemically exfoliating a parent material is initiated.

Embodiment 23

The method of embodiment 15, wherein the parent material comprises graphite, and wherein the exfoliated material comprises graphene.

Embodiment 24

The method of embodiment 15, wherein a source of the parent material comprises at least one of needle coke, petroleum coke, or synthetic graphite.

Embodiment 25

The method of embodiment 15, wherein the parent material is electrochemically exfoliated in a reactor comprising: a container configured to hold the electrolyte solution in fluid communication with the parent material; the porous chamber configured to hold the parent material; a pressure source that applies the pressure along the length of the porous chamber; a counter electrode; a working electrode; and an electrical power source in electrical communication with the counter electrode and the working electrode.

EXAMPLES

To facilitate a better understanding of the present disclosure, the following examples of certain aspects of some embodiments are given. In no way should the following examples be read to limit, or define, the entire scope of the disclosure.

Example 1

Tests were performed for evaluation of different working electrodes for exfoliation of parent material. In these tests, 200 grams of graphite flakes were compacted in a dialysis bag of varying dimensions. The graphite flakes (Sigma-Aldrich) were approximately 350 μm in the lateral dimension and pre-treated in an autoclave with nitric acid. A working electrode was also placed into the bed of the graphite flakes in the dialysis bag. Working electrodes used in these tests includes a platinum wire and graphite foil. The dialysis bag was clamped on both ends to seal the graphite flakes in the bag. This dialysis bag together with the working electrode was immersed in 3 L of a 0.1 M electrolyte solution of $(NH_4)_2SO_4$. The dialysis bag was oriented horizontally in the electrolyte solution. Copper mesh served as the counter electrodes. A pair of copper mesh counter electrodes were used and placed on top and bottom of the dialysis bag, respectively. A weight of 1500 g was placed on top of the dialysis bag with one of the copper mesh counter electrodes disposed between the weight and the dialysis bag.

For the test, the working and counter electrodes were connected to a power supply. 5 V were applied to the dialysis bag to initiate electrochemical exfoliation. The yield was determined after 24 hours of operation. For yield determination, a mixture of electrochemically exfoliated graphite (EEG) and unexfoliated graphite was washed via centrifugation with deionized water five times. After washing, the mixture was transferred to a 400 mL Erlenmeyer flask, and the flask was filled up to 300 mL with deionized water. After 30 seconds, the supernatant was transferred into a 1000 mL beaker while the remaining sediment in the flask was unexfoliated graphite. The supernatant was then diluted into 800 mL and shear mixed for 90 min at 8000 rpm. The yield was calculated by taking 10 mL of the solution from the middle of the beaker and vacuum filtering. This concentration was then used to determine approximately how much graphene was produced from the electrochemical reaction process.

The table below also provides the results of these tests for evaluation of the working electrode impacts yield.

TABLE 1

| Test | Bed Length (cm) | Bed Width (cm) | Bed Thickness (cm) | Working Electrode | Mass of Graphite Flakes (g) | Yield |
|---|---|---|---|---|---|---|
| 1 | 40.5 | 6.9 | 0.7 | Platinum | 200 | 24.4% |
| 2 | 40.5 | 6.9 | 0.7 | Graphite Foil | 200 | 26.9% |

As illustrated in FIG. 1 and the table above, working electrodes of platinum and graphite foil provided equivalent yield of EEG.

Example 2

Tests were performed for evaluation of how bed thickness impacts yield of exfoliated material. In these tests, graphite flakes were compacted in a dialysis bag of varying bed thicknesses. The graphite flakes (Sigma-Aldrich) were approximately 350 μm in the lateral dimension and pre-treated in an autoclave with nitric acid. Graphite foil as the working electrode was also placed into the bed of the graphite flakes in the dialysis bag. The dialysis bag was clamped on both ends to seal the graphite flakes in the bag. This dialysis bag (together with the working electrode) was immersed in a 3 L of a 0.1 M electrolyte solution of $(NH_4)_2SO_4$. The dialysis bag was oriented horizontally in the electrolyte solution. Copper mesh served as the counter electrodes. A pair of copper mesh counter electrodes were used and placed on top and bottom of the dialysis bag, respectively. A weight was placed on top of the dialysis bag with one of the copper mesh counter electrodes disposed between the weight and the dialysis bag.

For the test, the working and counter electrodes were connected to a power supply. 10V were applied to the dialysis bag to initiate electrochemical exfoliation. The yield was determined after 24 hours of operation. For yield determination, a mixture of electrochemically exfoliated graphite (EEG) and unexfoliated graphite was washed via centrifugation with deionized water five times. After washing, the mixture was transferred to a 400 mL Erlenmeyer flask, and the flask was filled up to 300 mL with deionized water. After 30 seconds, the supernatant was transferred into a 1000 mL beaker while the remaining sediment in the flask was unexfoliated graphite. The supernatant was then diluted into 800 mL and shear mixed for 90 min at 8000 rpm. The yield was calculated by taking 10 mL of the solution from the middle of the beaker and vacuum filtering. This concentration was then used to determine approximately how much graphene was produced from the electrochemical reaction process.

Figure 7:
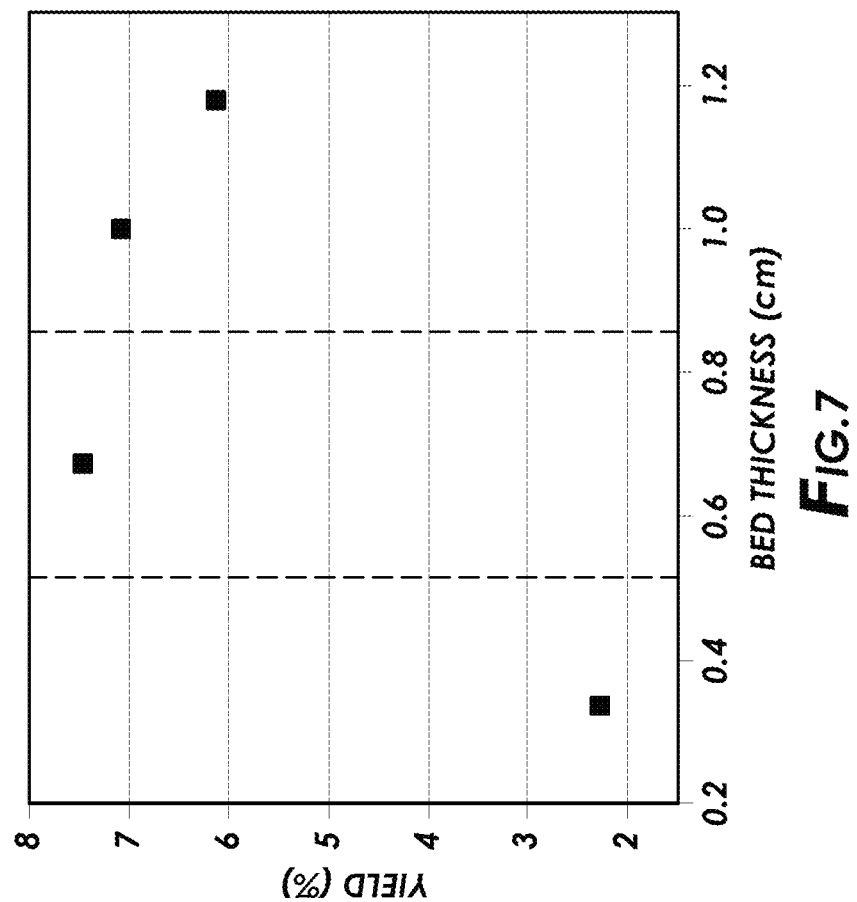
FIG. 7 is a chart of bed thickness versus yield for a reactor for electrochemical exfoliation in accordance with some embodiments of the present disclosure.

FIG. 7 is a graph of the results of this test illustrating the relationship between bed thickness and yield for a 24-hour reaction. The table below also provides the results of these tests for evaluation of how bed thickness impact yield.

TABLE 2

| Test | Bed Length (cm) | Bed Width (cm) | Bed Thickness (cm) | Graphite Foil (Working Electrode) (cm) | Mass of Graphite Flakes (g) | Mass of Weight (g) | Yield |
|---|---|---|---|---|---|---|---|
| 3 | 10 | 7.6 | .4 | 6 | 20 | 550 | 2.1% |
| 4 | 10 | 7.6 | .7 | 6 | 40 | 550 | 7.5% |
| 5 | 10 | 7.6 | 1.2 | 6 | 70 | 550 | 6.1% |

As illustrated in FIG. 7 and the table above, bed thickness impacts yield. For example, reactor performance may be optimized by decreasing bed thickness above a particular threshold.

Example 3

Tests were performed for evaluation of how bed dimensions impact yield of exfoliated material. In these tests, graphite flakes were compacted in a dialysis bag of varying dimensions. The graphite flakes (Sigma-Aldrich) were approximately 350 μm in the lateral dimension and pre-treated in an autoclave with nitric acid. Graphite foil as the working electrode was also placed into the bed of the graphite flakes in the dialysis bag. The dialysis bag was clamped on both ends to seal the graphite flakes in the bag. This dialysis bag (together with the working electrode) was immersed in a 3 L of a 0.1 M electrolyte solution of $(NH_4)_2SO_4$. The dialysis bag was oriented horizontally in the electrolyte solution. Copper mesh served as the counter electrodes. A pair of copper mesh counter electrodes were used and placed on top and bottom of the dialysis bag, respectively. A weight was placed on top of the dialysis bag with one of the copper mesh counter electrodes disposed between the weight and the dialysis bag.

For the test, the working and counter electrodes were connected to a power supply. 5 V were applied to the dialysis bag to initiate electrochemical exfoliation. The yield was determined after 30 minutes of operation. For yield determination, a mixture of electrochemically exfoliated graphite (EEG) and unexfoliated graphite was washed via centrifugation with deionized water five times. After washing, the mixture was transferred to a 400 mL Erlenmeyer flask, and the flask was filled up to 300 mL with deionized water. After 30 seconds, the supernatant was transferred into a 1000 mL beaker while the remaining sediment in the flask was unexfoliated graphite. The supernatant was then diluted into 800 mL and shear mixed for 90 min at 8000 rpm. The yield was calculated by taking 10 mL of the solution from the middle of the beaker and vacuum filtering. This concentration was then used to determine approximately how much graphene was produced from the electrochemical reaction process.

FIG. 7 is a graph of the results of this test illustrating the relationship between bed thickness and yield for a 24-hour reaction. The table below also provides the results of these tests for evaluation of how bed dimensions impact yield.

TABLE 3

| Test | Bed Length (mm) | Bed Width (mm) | Bed Thickness (mm) | Graphite Foil (Working Electrode) (mm) | Mass of Graphite Flakes (g) | Mass of Weight (g) | Yield |
|---|---|---|---|---|---|---|---|
| 6 | 100 | 25 | 2.1 | 10 | 5 | 550 | 14% |
| 7 | 150 | 25 | 2.1 | 10 | 8 | 550 | 13% |
| 8 | 150 | 76 | 2.1 | 10 | 23 | 550 | 4% |
| 9 | 150 | 76 | 2.1 | 30 | 23 | 550 | 3% |
| 10 | 150 | 76 | 2.1 | 61 | 23 | 550 | 4% |
| 11 | 265 | 25 | 2.1 | 10 | 13 | 550 | 13% |

As illustrated in the table above, bed dimensions can impact yield. For example, reactor performance may be optimized by decreasing bed width. However, the data also show that the yield may not decrease even with increasing bed length for constant bed width and thickness.

Example 4

Tests were performed for evaluation of reactor kinetics. In these tests, 5 grams of graphite flakes were compacted in a dialysis bag of varying dimensions. The graphite flakes (Sigma-Aldrich) were approximately 350 μm in the lateral dimension and pre-treated in an autoclave with nitric acid. Graphite foil with a width of 10 mm as the working electrode was also placed into the bed of the graphite flakes in the dialysis bag. The dialysis bag was clamped on both ends to seal the graphite flakes in the bag. The bed of graphite flakes in the dialysis bad had a thickness of 2.1 mm, a length of 100 mm, and a width of 25 mm. This dialysis bag (together with the working electrode) was immersed in 3 L of a 0.1 M electrolyte solution of $(NH_4)_2SO_4$. The dialysis bag was oriented horizontally in the electrolyte solution. Copper mesh served as the counter electrodes. A pair of copper mesh counter electrodes were used and placed on top and bottom of the dialysis bag, respectively. A weight of 550 g was placed on top of the dialysis bag with one of the copper mesh copper electrodes disposed between the weight and the dialysis bag.

For the test, the working and counter electrodes were connected to a power supply. 5 V were applied to the dialysis bag to initiate electrochemical exfoliation. The yield was determined after 30 minutes of operation. For yield determination, a mixture of electrochemically exfoliated graphite (EEG) and unexfoliated graphite was washed via centrifugation with deionized water five times. After washing, the mixture was transferred to a 400 mL Erlenmeyer flask, and the flask was filled up to 300 mL with deionized water. After 30 seconds, the supernatant was transferred into a 1000 mL beaker while the remaining sediment in the flask was unexfoliated graphite. The supernatant was then diluted into 800 mL and shear mixed for 90 min at 8000 rpm. The yield was calculated by taking 10 mL of the solution from the middle of the beaker and vacuum filtering. This concentration was then used to determine approximately how much graphene was produced from the electrochemical reaction process.

The table below also provides the results of these tests for evaluation of reactor kinetics. The volume percent expansion was calculated on the total volume of the graphite and graphene in the dialysis bag after the reaction ($V_{final}$) and the initial volume of graphite that was inserted into the bag ($V_{initial}$). The mean lateral size of the EEG is also reported.

TABLE 4

| Time (min) | $V_{final}/V_{initial}$ | Exfoliated Volume Fraction (Optical) | Yield | Mean Lateral Size (EEG) |
|---|---|---|---|---|
| 5 | 155% | 7.6 | 0% | N/A |
| 30 | 186% | 39.8 | 12% | 47.2 |
| 60 | 347% | 75.9 | 15% | 46.9 |
| 120 | 354% | 71.6 | 24% | 42.6 |
| 240 | 457% | 94.3 | 43% | 47.5 |
| 360 | Bag Rupture | N/A | 45% | 47.3 |

As illustrated in the table above, the volume expands with increasing reaction time indicating production of EEG. During the first 30 minutes of reaction, the reaction progresses quickly. After the initial 30 minutes, the reaction slows but continues in a positive linear trend before finally reaching a plateau. This plateau may also be correlated with graphite expansion limit of the dialysis bag with high enough yields causing bag rupture. This occurred because the dialysis bag did not have an upper volume limit that cannot be exceed without rupture.

Figure 9:
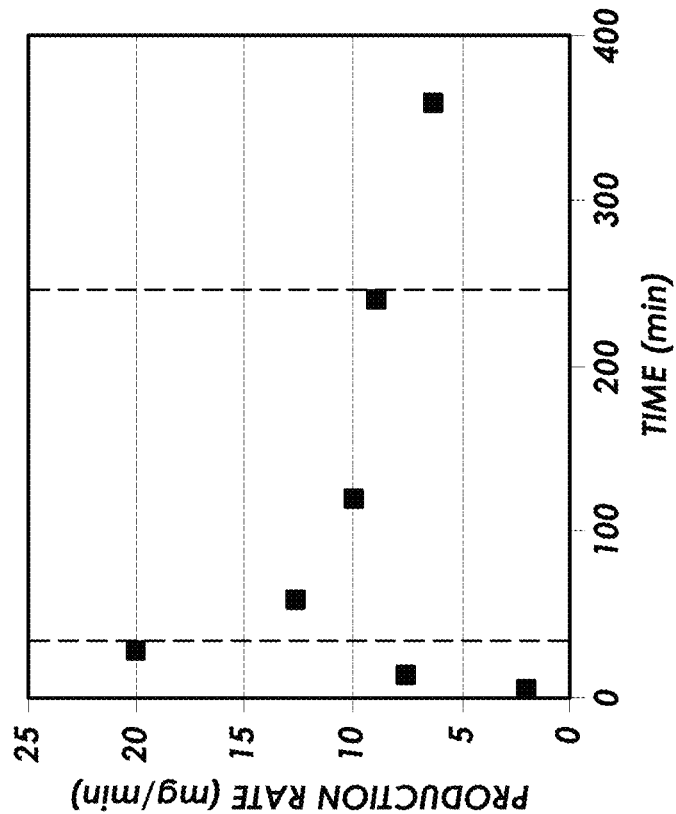
FIG. 9 is a chart of time versus product rate for a reactor for electrochemical exfoliation in accordance with some embodiments of the present disclosure.
Figure 8:
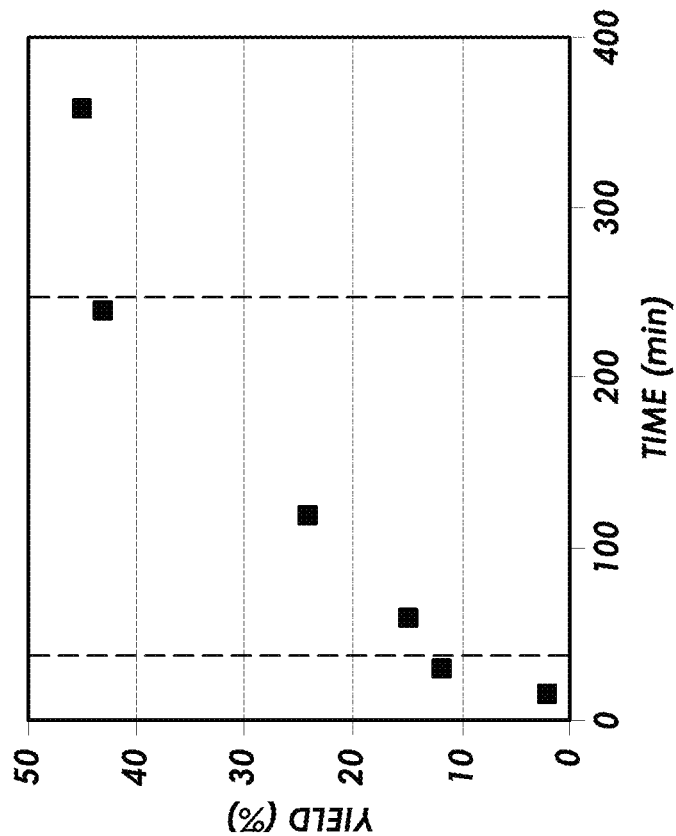
FIG. 8 is a chart of time versus yield for a reactor for electrochemical exfoliation in accordance with some embodiments of the present disclosure.

FIGS. 8 and 9 are graphs of yield versus time and product rate versus time for this test. Production rate versus time was calculated as the time derivative of produced EEG mass per time. As with most batch reactors, the maximum reaction rate occurred at the initial stages of the reaction (e.g., first 30 minutes as shown). This occurs because the maximum graphite availability occurs at the initial instant and, as the reaction proceeds, less graphite is available for expansion and diffusion limitations begin to have an effect.

Example 5

Tests were performed for evaluation of how positioning of the counter electrode impacts yield of exfoliated material. In these tests, 5 grams graphite flakes were compacted in a dialysis bag. The graphite flakes (Sigma-Aldrich) were approximately 350 μm in lateral dimension and pre-treated in an autoclave with nitric acid. A platinum working electrode was also placed into the bed of the graphite flakes in the dialysis bag. The dialysis bag was clamped on both ends to seal the graphite flakes in the bag. The bed of graphite flakes in the dialysis bag had a length of 100 mm, a width of 25 mm, and a thickness of 2.1 mm. This dialysis bag was immersed in a 3 L of a 0.1 M electrolyte solution of $(NH_4)_2SO_4$. The dialysis bag was oriented horizontally in the electrolyte solution. Copper mesh served as the counter electrodes. Two counter electrode arrangements were tested.

In one test, a copper mesh counter electrode was placed on top of the dialysis bag and the other used copper mesh cs were used and placed on top and bottom of the dialysis bag, respectively. A weight of 550 g was placed on top of the dialysis bag with the copper mesh counter electrode on top disposed between the weight and the dialysis bag.

For the test, the working and counter electrode(s) were connected to a power supply. 10 V were applied to the dialysis bag to initiate electrochemical exfoliation. The yield was determined after 30 minutes of operation. For yield determination, a mixture of electrochemically exfoliated graphite (EEG) and unexfoliated graphite was washed via centrifugation with deionized water five times. After washing, the mixture was transferred to a 400 mL Erlenmeyer flask, and the flask was filled up to 300 mL with deionized water. After 30 seconds, the supernatant was transferred into a 1000 mL beaker while the remaining sediment in the flask was unexfoliated graphite. The supernatant was then diluted into 800 mL and shear mixed for 90 min at 8000 rpm. The yield is calculated by taking 10 mL of the solution from the middle of the beaker and vacuum filtering. This concentration can then be used to determine approximately how much graphene was produced from the electrochemical reaction process.

The table below also provides the results of these tests for evaluation of how arrange of the counter electrode impacts yield.

TABLE 3

| Test | Counter Electrodes | Yield |
|---|---|---|
| 12 | 1 (top) | 5.2% |
| 13 | 2 (top/bottom) | 12.0% |

As illustrated in the table above, arrangement of the counter electrode can impact yield. For example, reactor performance can increase with counter electrodes positioned above and below the graphite bed, for example, due to an increase in overlap area between the working and counter electrodes.

Example 6

Figure 10:
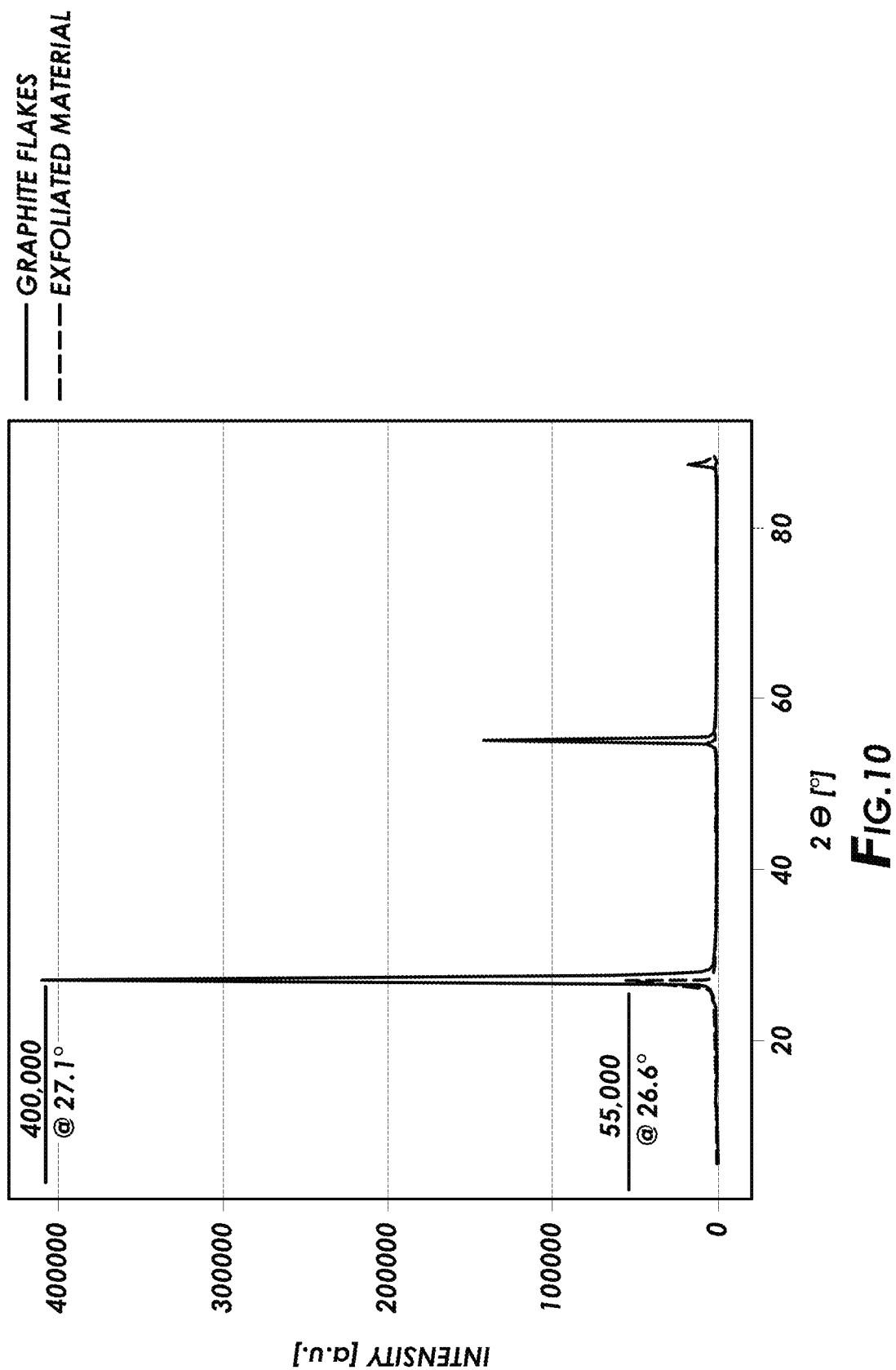
FIG. 10 are x-ray diffraction (XRD) patterns of graphite flakes and an exfoliated material produced from electrochemical exfoliation in accordance with some embodiments of the present disclosure.

Additional analysis was performed to compare the parent material graphite flakes (Sigma-Aldrich) with exfoliated material produced from the graphite flakes in accordance with the techniques disclosed herein. The graphite flakes and exfoliated material were characterized by XRD spectroscope. FIG. 10 compares the XRD patterns of the graphite flakes (Sigma Aldrich) used in the Examples with exfoliated material produced in accordance with the techniques disclosed herein. The results indicate that the peak intensity decreased from 400,000 arbitrary units (a.u.) for graphite at 27.1° to 55,000 a.u. for the exfoliated material at 26.6°.

Example 7

Figure 12:
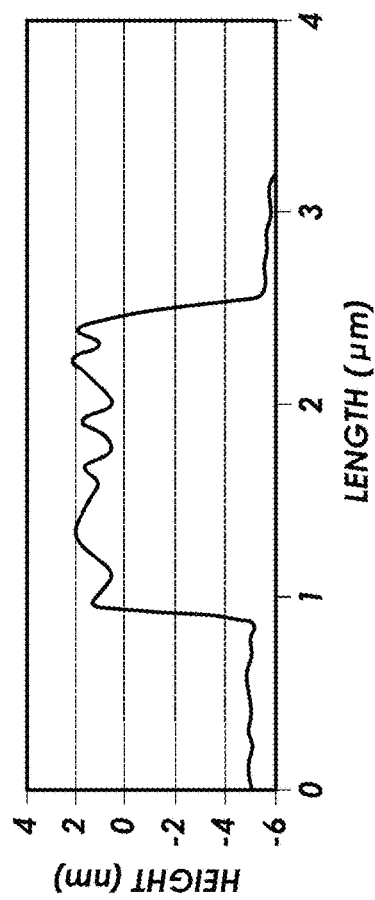
FIG. 12 is a height profile produced from the atomic force microscopy image of FIG. 11.
Figure 11:
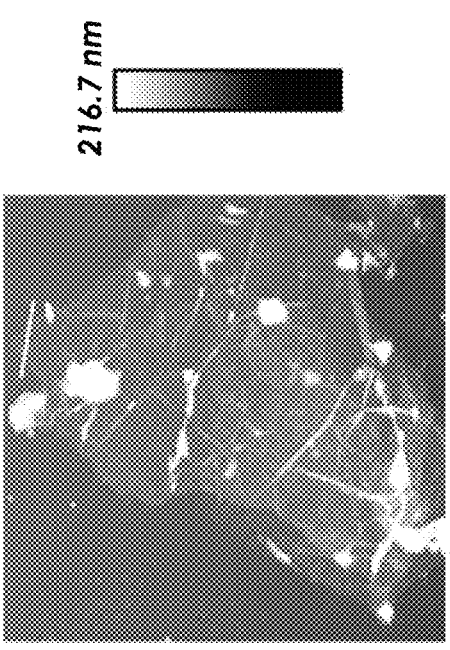
FIG. 11 is an atomic force microscopy (AFM) image of an exfoliated material produced from electrochemical exfoliation in accordance with some embodiments of the present disclosure.
Figure 14:
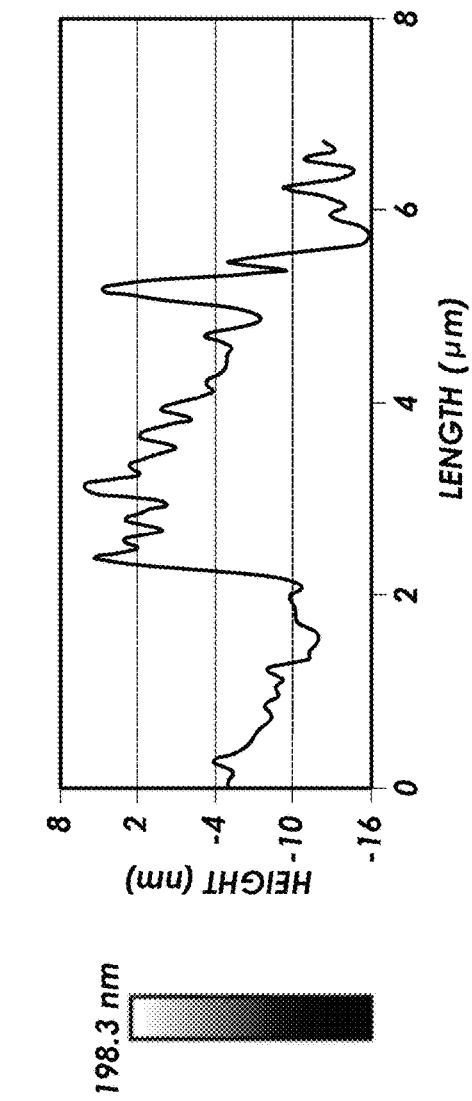
FIG. 14 is a height profile produced from the atomic force microscopy image of FIG. 13.
Figure 13:
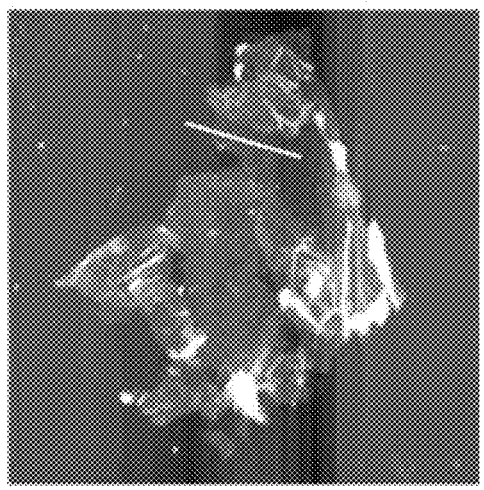
FIG. 13 is another AFM image of an exfoliated material produced from electrochemical exfoliation in accordance with some embodiments of the present disclosure.

Surface morphology of the exfoliated material produced from the graphite flakes in accordance with disclosed embodiments was imaged with a Multimode scanning probe microscope (AFM) (Bruker Dimension Icon) operated in tapping mode. The exfoliated material was drop-cast at 0.08 mg/ml on a freshly cleaved mica surface for AFM imaging. FIG. 11 illustrates an AFM image of the exfoliated material with a corresponding height profile shown on FIG. 12. FIG. 13 illustrates an AFM image of the exfoliated material with a corresponding height profile shown on FIG. 14. From analysis of the AFM images, the exfoliated material was determined to have an approximate height of 7 nanometers, an approximate lateral size of 10 microns, and an approximate aspect ratio of 1,000.

Example 8

Tests were performed for evaluation of application of the exfoliated material in supercapacitors. The exfoliated material was prepared from graphite flakes in accordance with embodiments described herein. A two-electrode Swagelok® stainless steel cell with stainless steel pistons/cylinders was used for quantitative electrochemical characterization of EEG and other commercial graphene powders (Comparative Graphene A from ACS Material® advanced chemicals supplier, Comparative Graphene B Knano® Graphene Technology, and Comparative Graphene C Graphene Supermarket® graphene supplier). Platinum disks were placed onto stainless steel current collectors to decrease the contact resistance at the graphene/cylinder interface. A Celgard separator (3501 Coated PP) was used. The electrolyte was 1 M $H_2SO_4$. The working and counter electrode were prepared as follows: (1) the graphene powder was mixed well with PTFE (Dupont de Nemours) and active carbon at a weight ratio of 8:1:1 in 20 mL ethanol under magnetic stirring; (2) the mixture was then heated up in oil bath at 70° C. to evaporate ethanol with constant stirring; and (3) afterwards, the solid mixture was rolled to a very thin film and punched into several pieces of circle of 8 mm in diameter. All the thin electrode films have a similar thickness of ~0.2 mm.

The electrochemical testing was performed with a Gamry Reference 3000 potentiostat. From cyclic voltammetry (CV) curve, the specific capacitance (F/g) was calculated based on the equation:

$$C = 2 \oint_{V_1}^{V_2} \frac{IdV}{v \times \Delta V \times m},$$

where $V_1$, $V_2$ are the low-voltage cutoff ($V_1$) and high-voltage cutoff ($V_2$), respectively; I is the current (A), v is scan rate (V/s), $\Delta V$ is the potential window (V), and m is the mass of two electrodes (g).

Figure 15:
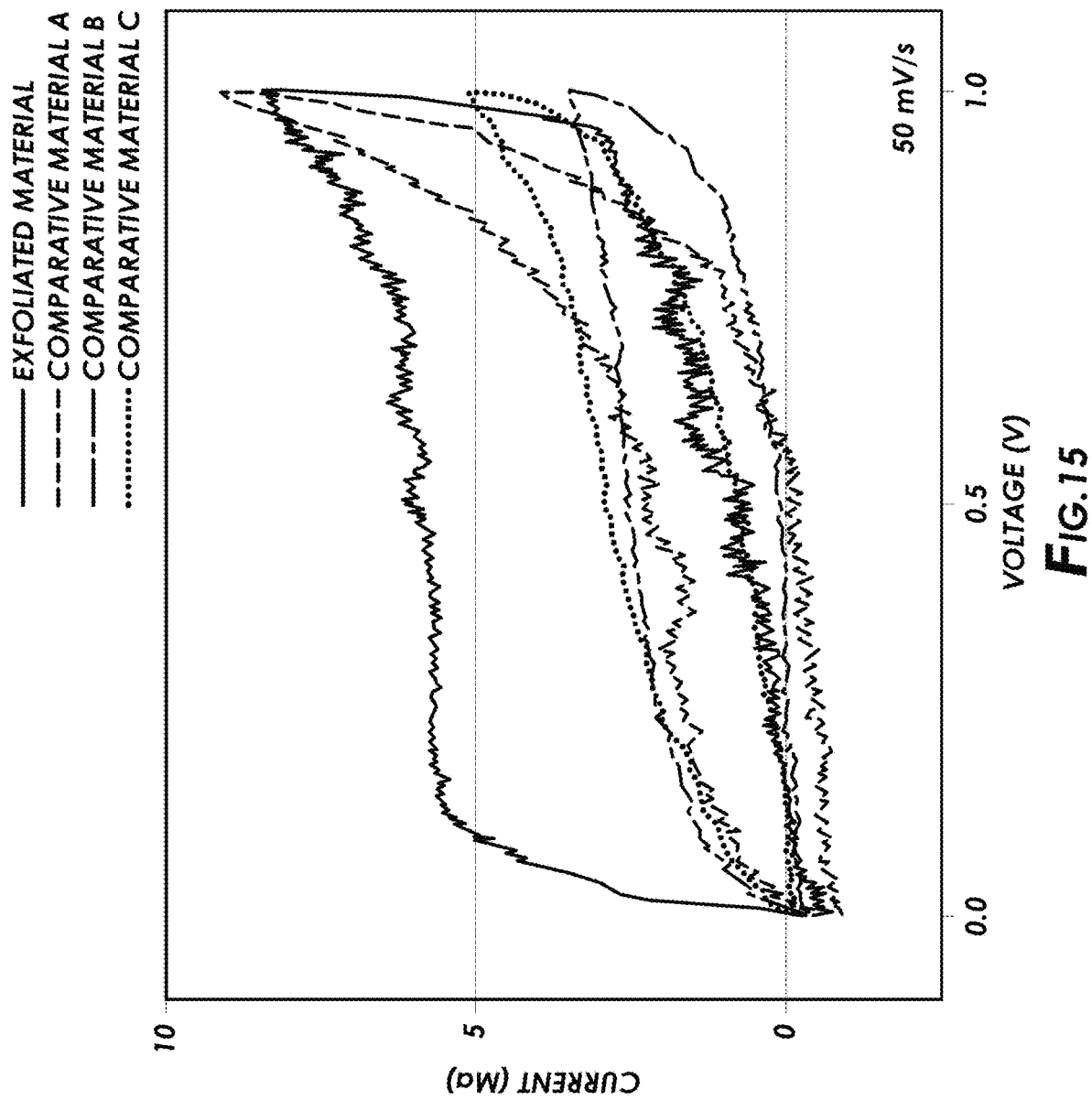
FIGS. 15 and 16 are charts comparing exfoliated material produced from electrochemical exfoliation in accordance with some embodiments of the present disclosure in supercapacitor electrodes with other graphene sources.
Figure 16:
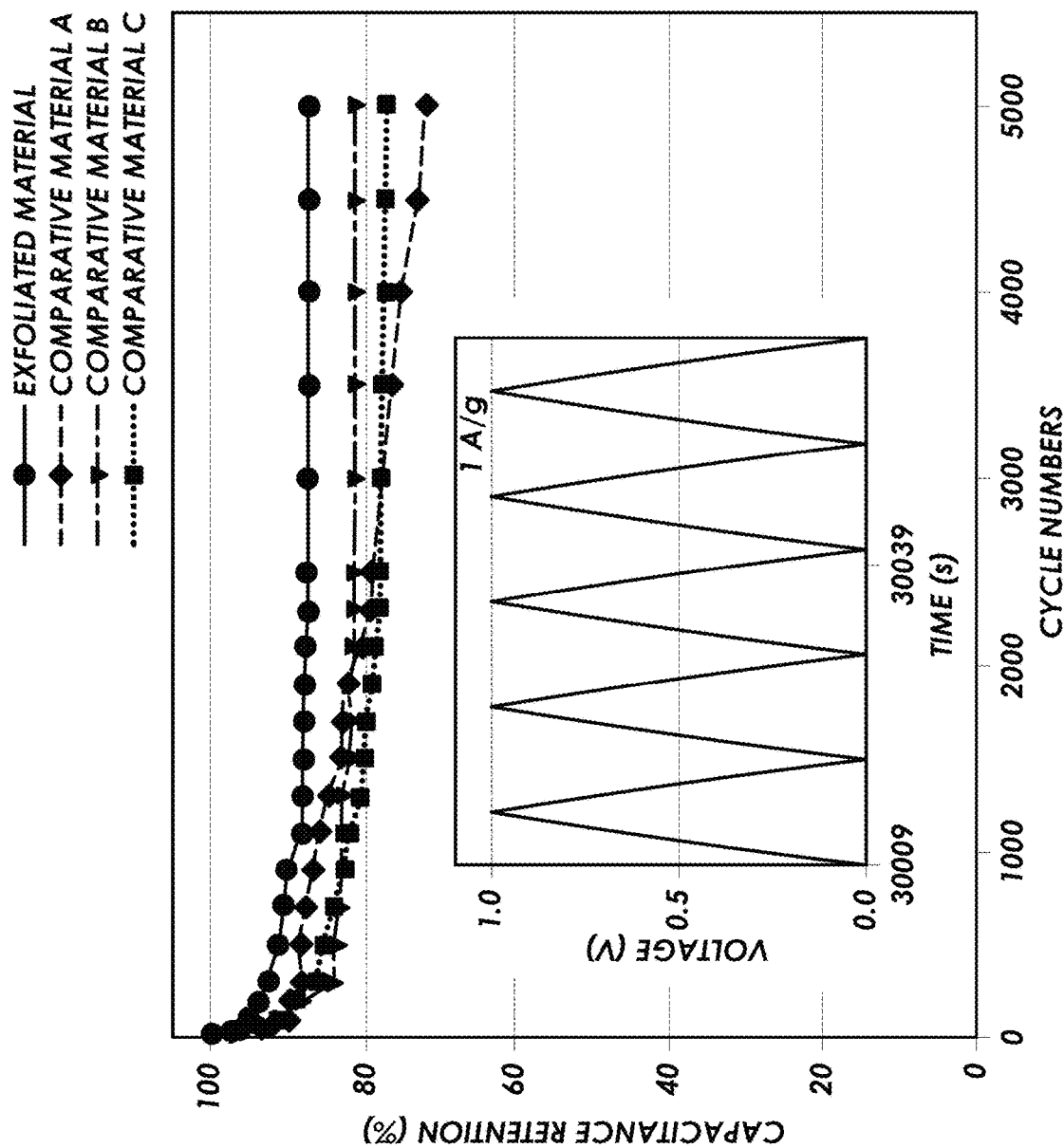

The CV curves (at a scan rate of 50 mV/s) of supercapacitors based on the tested graphene powders are shown in FIG. 15. It is clear that the supercapacitor based on exfoliated material has more pronounced rectangular shape than the others, implying the more supercapacitor behavior of exfoliated material. Meanwhile, the very sharp cut-off of exfoliated material curves implies the highest electrical conductivity of exfoliated material, compared to the ones of other commercial graphene. FIG. 16 shows the cycle life of symmetric supercapacitors based on exfoliated material and other commercial graphene. The insert of FIG. 16 is the charge-discharge curves of EEG during cycling.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description and the claims herein modified by "about" or "approximately" with respect to the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A method of electrochemical exfoliation, comprising: electrochemically exfoliating a parent material, wherein the electrochemically exfoliating comprises
    introducing the parent material into a porous chamber, wherein the parent material is sealed in the porous chamber, wherein the porous chamber comprises pores having pore sizes between about 10 nanometers and about 10 micrometers,
    applying pressure along a length of the porous chamber to thereby compress the parent material in the porous chamber, wherein the pressure is applied by a weight from gravity to a first counter electrode and then to the porous chamber, wherein the first counter electrode is disposed between the weight and a lateral area of the porous chamber, and
    applying a potential bias to the parent material, wherein the potential bias is applied to a pair of counter electrodes comprising the first counter electrode and a second counter electrode, wherein the second counter electrode is disposed underneath the porous chamber, wherein a working electrode is disposed in the porous chamber to contact the parent material, while at least a portion of the parent material is in contact with an electrolyte solution to produce a mixture of exfoliated material and unexfoliated parent material; and separating at least a portion of the exfoliated material from the unexfoliated parent material.

2. The method of claim 1, further comprising pretreating the parent material to increase hydrophilicity.

3. The method of claim 1, wherein the step of separating comprises combining the mixture with a solvent and then placing the combination of the solvent and the mixture in a separation tower to allow sedimentation of the unexfoliated parent material, wherein the solvent comprises water and ethanol, wherein a volume fraction of the ethanol in the solvent is in a range from about 10% to about 40%.

4. The method of claim 1, wherein a maximum production rate of the exfoliated material is achieved in about 30 minutes or less after the step of electrochemically exfoliating the parent material is initiated.

5. The method of claim 1, wherein the parent material comprises graphite, and wherein the exfoliated material comprises graphene.

6. The method of claim 1, wherein a source of the parent material comprises at least one of needle coke, petroleum coke, or synthetic graphite.

7. The method of claim 1, wherein the parent material is electrochemically exfoliated in a reactor comprising: a container configured to hold the electrolyte solution in fluid communication with the parent material; the porous chamber configured to hold the parent material; the weight; the pair of counter electrodes; the working electrode; and an electrical power source in electrical communication with the pair of counter electrodes and the working electrode.

8. The method of claim 2, wherein the step of pretreating comprises treatment with a hydrophilic moiety or an oxygen plasma treatment.

9. The method of claim 2, wherein the pretreating comprises treatment with at least one hydrophilic moiety selected from the group consisting of a hydroxyl group, a carbonyl group, an amine group, an epoxide group, an ether group, a diazonium group, and a carboxyl group.

10. The method of claim 1, wherein the separating of the unexfoliated parent material from the exfoliated material comprises centrifuging.

11. The method of claim 8, wherein the pretreating comprises treating the parent material with an acid solution, heating the parent material during exposure to the acid solution, and washing the parent material with water after heating.

12. The method of claim 1, further comprising recycling at least a portion of the unexfoliated parent material by reintroducing it into the porous chamber.

13. The method of claim 1, further comprising: post-treating at least a portion of the mixture, wherein the post-treating comprises dispersing at least a portion of the exfoliated material through shear mixing; and drying either or both the dispersed and the exfoliated material.

14. The method of claim 1, wherein the pressure is applied transverse to the longitudinal axis to at least 90% of the length of the porous chamber.

15. The method of claim 1, further comprising allowing current to flow between the pair of counter electrodes, the working electrode, and the porous chamber.

16. The method of claim 15, wherein the pressure comprises a constant lateral pressure applied by the weight along at least a substantial length of the porous chamber.

17. The method of claim 1, wherein the porous chamber is a bag having a structure disposed therein to control the shape thereof.

18. The method of claim 1, wherein the pair of counter electrodes, the working electrode, and the porous chamber are all oriented within a margin of about plus or minus 85 degrees from a horizontal.

19. The method of claim 1, wherein either the first or second counter electrode comprises copper mesh, and wherein the applying of the potential bias comprises applying a negative voltage to the pair of counter electrodes and a positive voltage to the counter electrode.

20. The method of claim 1, wherein the porous chamber comprises a first seal positioned on a first end of the porous chamber and a second seal positioned on a second end opposite the first end.

* * * * *